(12) United States Patent
Marufuji

(10) Patent No.: US 8,262,463 B2
(45) Date of Patent: Sep. 11, 2012

(54) GAME SYSTEM, COMMUNICATION APPARATUS THEREFOR, GAME TERMINAL THEREFOR, GAME APPARATUS THEREFOR, AND COMPUTER PROGRAM THEREFOR

(75) Inventor: Yohei Marufuji, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 268 days.

(21) Appl. No.: 12/713,788

(22) Filed: Feb. 26, 2010

(65) Prior Publication Data

US 2010/0178983 A1 Jul. 15, 2010

Related U.S. Application Data

(63) Continuation of application No. PCT/JP2008/065543, filed on Aug. 29, 2008.

(30) Foreign Application Priority Data

Aug. 30, 2007 (JP) ................................ 2007-223918

(51) Int. Cl.
*A63F 13/00* (2006.01)
(52) U.S. Cl. ............................................. 463/23; 463/8
(58) Field of Classification Search ................ 463/8, 23, 463/36, 37
See application file for complete search history.

(56) References Cited

U.S. PATENT DOCUMENTS

| | | | | |
|---|---|---|---|---|
| 6,152,821 A * | 11/2000 | Nakagawa et al. | ............... | 463/4 |
| 6,629,893 B1 | 10/2003 | Funatsu et al. | | |
| 7,666,079 B2 * | 2/2010 | Ishii | .................................. | 463/8 |
| 2005/0014543 A1 * | 1/2005 | Itoi et al. | ........................... | 463/8 |
| 2007/0066403 A1 * | 3/2007 | Conkwright | .................... | 463/43 |
| 2007/0202936 A1 * | 8/2007 | Ishii | .................................. | 463/8 |

FOREIGN PATENT DOCUMENTS

| | | |
|---|---|---|
| JP | 11-156049 A | 6/1999 |
| JP | 11-333137 | 12/1999 |
| JP | 11-333137 A | 12/1999 |
| JP | 2000-135372 A | 5/2000 |
| JP | 2007-325847 A | 12/2007 |
| JP | 2008-246150 A | 10/2008 |
| TW | 200606701 | 2/2006 |
| WO | 99/61122 A1 | 12/1999 |

OTHER PUBLICATIONS

International Search Report mailed Nov. 25, 2008 in International Application No. PCT/JP2008/065543.
Taiwanese Office Action dated Oct. 2011.

* cited by examiner

*Primary Examiner* — James S McClellan
(74) *Attorney, Agent, or Firm* — Sughrue Mion, PLLC

(57) ABSTRACT

The present invention provides a game system (10) having a game terminal (20) and a communication apparatus (30). A processor (29) of the game terminal (20) receives a command from a participant player during a play of a game, counts the number of inputs for each command, and transmits count result data indicating the result to a communication apparatus (30). A processor (33) of the communication apparatus (30) receives and aggregates the data, identifies, based on the result, a command for which the number of inputs exceeds a predetermined standard value, and transmits to game terminal (20) setting data in association with the identified command, the setting data indicating a weighting factor that has smaller effect on a play result than a weighting factor set to the command. The processor (29) receives this and updates weighting factor data indicating a weighting factor set to a corresponding command so as to indicate the weighting factor by the received setting data.

19 Claims, 13 Drawing Sheets

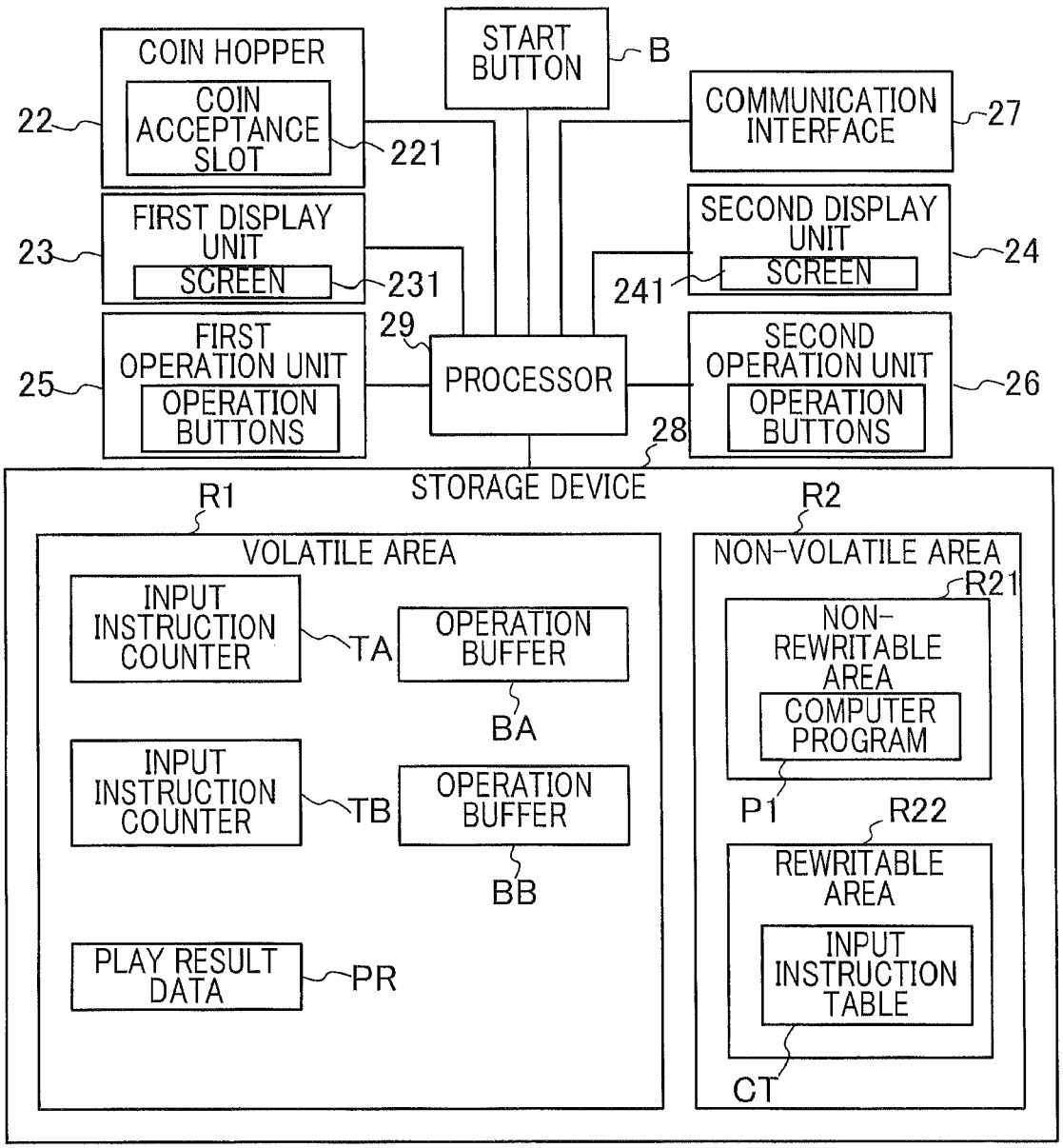

| IDENTIFICATION DATA | INPUT OPERATION DATA | WEIGHTING FACTOR DATA | CT |
|---|---|---|
| | | |
| | | |

| IDENTIFICATION DATA | WEIGHTING FACTOR DATA | OFFSET DATA | ST |
|---|---|---|---|
|  |  |  |  |
|  |  |  |  |

| IDENTIFICATION DATA | AGGREGATED WIN VALUE DATA | AGGREGATED LOSS VALUE DATA | AT |
|---|---|---|---|
|  |  |  |  |
|  |  |  |  |

FIG. 17

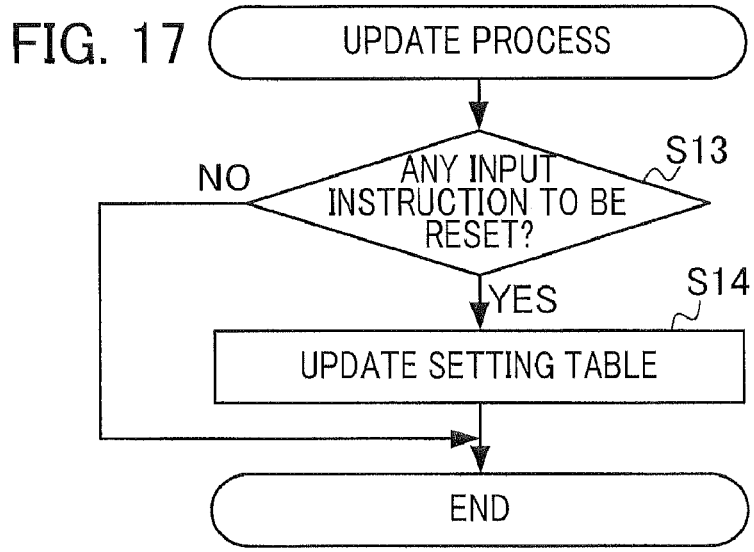

FIG. 18

| INPUT INSTRUCTION | WEIGHTING FACTOR | OFFSET |
|---|---|---|
| FIRST INPUT INSTRUCTION | 5 | 0 |
| SECOND INPUT INSTRUCTION | 3 | 0 |
| THIRD INPUT INSTRUCTION | 4 | 0 |
| FOURTH INPUT INSTRUCTION | 8 | 0 |
| FIFTH INPUT INSTRUCTION | 2 | 0 |

FIG. 19

| INPUT INSTRUCTION | AGGREGATED WIN VALUE | AGGREGATED LOSS VALUE |
|---|---|---|
| FIRST INPUT INSTRUCTION | 8 | 7 |
| SECOND INPUT INSTRUCTION | 7 | 1 |
| THIRD INPUT INSTRUCTION | 2 | 3 |
| FOURTH INPUT INSTRUCTION | 12 | 1 |
| FIFTH INPUT INSTRUCTION | 8 | 10 |

FIG. 20

| INPUT INSTRUCTION | AGGREGATED WIN VALUE | AGGREGATED LOSS VALUE | DIFFER-ENCE |
|---|---|---|---|
| FIRST INPUT INSTRUCTION | 8 | 7 | 1 |
| SECOND INPUT INSTRUCTION | 7 | 1 | 6 |
| THIRD INPUT INSTRUCTION | 2 | 3 | −1 |
| FOURTH INPUT INSTRUCTION | 12 | 1 | 11 |
| FIFTH INPUT INSTRUCTION | 8 | 10 | −2 |

FIG. 21

| INPUT INSTRUCTION | WEIGHTING FACTOR | OFFSET |
|---|---|---|
| FIRST INPUT INSTRUCTION | 5 | 0 |
| SECOND INPUT INSTRUCTION | 3 | −1 |
| THIRD INPUT INSTRUCTION | 4 | 0 |
| FOURTH INPUT INSTRUCTION | 8 | −2 |
| FIFTH INPUT INSTRUCTION | 2 | 0 |

GAME SYSTEM, COMMUNICATION APPARATUS THEREFOR, GAME TERMINAL THEREFOR, GAME APPARATUS THEREFOR, AND COMPUTER PROGRAM THEREFOR

CROSS-REFERENCE TO PRIOR APPLICATIONS

This application is a continuation of International Application No. PCT/JP2008/065543, filed on Aug. 29, 2008, which claims priority to Japanese Application No. 2007-223918, filed Aug. 30, 2007, the disclosure of each of which is incorporated herein by express reference thereto.

TECHNICAL FIELD

The present invention relates to a game system for a computer game in which a game advances according to a player's input instruction, a communication apparatus therefor, a game terminal therefor, a game apparatus therefor, and a computer program therefor.

BACKGROUND ART

There is a type of a computer game in which when an input instruction by a participant player is received, a play result is determined based on the value of a weighting factor set to this input instruction. An example of a game terminal for such a computer game would be one described in Japanese Patent Application Laid-Open Publication No. 11-156049.

A computer game implemented by a game terminal described in Japanese Patent Application Laid-Open Publication No. 11-156049 is a wrestling game in which, in a play, two players each operate a character by an input instruction, to make a character fight with an opponent character. A player of this game, by operating a game terminal to input an input instruction, can have the player's own character attack an opponent character and defend against an attack from an opponent character.

Section [0062] of Japanese Patent Application Laid-Open Publication No. 11-156049 describes that the intensity of a counterattack immediately after a character defends against an attack from the other character can be changed according to the effectiveness of the defense. In other words, in Japanese Patent Application Laid-Open Publication No. 11-156049, there is a teaching of a game terminal for a computer game in which a weighting factor can be varied according to a play situation.

A play result (for example, win or loss) of a computer game is usually affected by a weighting factor that has been set to an input instruction input by a player. Therefore, in designing a computer game, weighting factors should be determined so as not to favor players who input a particular input instruction that can be input by a relatively easy operation, i.e., so as not to disrupt the game balance.

However, a player's skill would be improved in the input operation for input instructions (i.e. operation of a game terminal), and the speed of the improvement should vary depending on an input instruction and on a player. Therefore, in designing a computer game, it would be nearly impossible to accurately predict the transition in the appropriate value of a weighting factor. Thus, even if, in designing a computer game, weighting factors are set so as not to disrupt the game balance, the game balance would be lost in reality.

Accordingly, considering that such a system is important so that the game balance is automatically corrected when the game balance of a computer game is disrupted, the inventor of the present invention newly devised the system as the present invention. This system is for identifying an input instruction for which a weighting factor has been set in such a way that it greatly affects a play result even though an input operation thereof is easy, and for changing the weighting factor set to the identified input instruction so that the effect which the weighting factors renders on the play result will be reduced. In Japanese Patent Application Laid-Open Publication No. 11-156049, there is no teaching identifying an input instruction for which a weighting factor has been set in such a way that it greatly affects a play result even though an input operation thereof is easy, or changing the weighting factor set to the identified input instruction so that the effect which the weighting factors renders on the play result will be reduced.

DISCLOSURE OF INVENTION

The present invention has been made in view of the above situation and has as objects to provide a game system in which it is possible to identify an input instruction for which a weighting factor that greatly affects a play result has been set even though the input operation thereof is easy, and to change the weighting factor set for the input instruction so that the effect which the weighting factor renders on a play result will be reduced, a communication apparatus therefor, a game terminal therefor, a game apparatus therefor, and a computer program therefor.

Description will first be given of terms used in this specification.

A "game" is an activity involving some rules for determining a result of a play (game play). The "game" includes a multiple-player game in which two or more participant players or two or more participant teams compete or cooperate and a single-player game in which a participant player plays a game to achieve an object or for enjoyment, i.e., a one-person game, and a puzzle.

A "play" of a game is a single act of a player performing a game. Therefore, in a single game, plural plays can be repeated by the same player, and plural plays may be performed simultaneously by plural players. A person who can perform each play is called a "player" of the play or game. Therefore, even if a person has not played a game in the past or is not currently playing a game, a person who potentially plays a game is sometimes called a player. However, a player who is actually playing a game and has played a game, in particular, is called a "participant player (participating player)" of the play. In each play, a "result" of the play is an evaluation which a participant player of the play has as an object. Examples of a result of a play include win or loss, a rank, and a score.

A game includes a single-player type game in which the number of participant players in one play of the game is a single and a multiple-player type game in which the number is plural. Examples of a multiple-player type game includes an individual-evaluation type game in which a result of each play is determined for each participant player of the play, and a team-evaluation type game in which a result of each play is determined for each participant team being a group of participant players of this play. Furthermore, as a multiple-player game, a competition type game may be mentioned in which, in each play, participant players of the play or participant teams of the play compete with one another, or a cooperation type game in which participant players or participant teams cooperate with one another. A competition type game includes a match-up game in which participant players or participant teams go against one another.

A game can be implemented as a computer game. A "computer game" is a game for which a play is carried out by a computer. A computer used for carrying out a computer game is called a "game apparatus" for the computer game. Among game apparatuses for a computer game is a "game terminal" which has a user interface (input interface) for operation by a player of the computer game. A system that has a game apparatus for a computer game is called a "game system" for the computer game.

A place at which a game terminal is installed is called a "game place" or "venue". Examples of a game place include a facility at which visitors use the installed game terminal by paying a fee (for example, a game arcade) and a residential household at which a game terminal is installed. In the former, a visitor in most cases will be a user of a game terminal and will be a player of a computer game; and in the latter, a resident in most cases will be a user of a game terminal and will be a player of a computer game. In the former, a game terminal that has a function of collecting fees from its user (for example, a type of business-use game machine) is installed in most cases; and in the latter, a game terminal that does not have a function of collecting fees from its user (for example, a type of household use game machine) is installed in most cases.

Examples of a game apparatus or a game system include one in which the number of executable computer games is one, or is one in which the number is multiple. Examples of a game system is one that has only a single game terminal, one that has multiple game terminals, and one that has multiple game apparatuses. Examples of a game system having plural game apparatuses include a game system (network-type game system) that uses a network to which every game apparatus belongs as a node.

A "network" has terminations and is a system in which data can be transmitted and received among plural terminal nodes belonging to the system. Included as an example of a network is a network in which a communication address unique to this network (for example, an IP address (Internet Protocol address)) is assigned to each terminal node belonging to the network. The communication address is used to transmit and receive data among terminal nodes. A "terminal node" is one that serves as a termination of a network from among nodes belonging to the network to which the terminal node belongs. A "node" is an apparatus or a system that transmits or receives data within a network to which the node belongs. Examples of a node include a computer and a network. A network including plural networks as plural nodes is called an "internetwork". Examples of an internetwork include the Internet.

Examples of a network-type game system having plural game terminals include a master-slave type game system, a server-client type game system, and a peer-to-peer type game system. Examples of a server-client type game system include a game system in which a server game apparatus and a client game terminal are statically determined, a game system in which both are dynamically determined, and a game system involving a game terminal concurrently working as a server and a client.

A "computer" or a "computer system" is, from among apparatuses for processing data, one that has a memory for storing data and a processor for executing a computer program or a computer program element stored in the memory. "Data" represents information in a form that is recognizable by a machine such as a computer. Examples of data include data electrically representing information, data magnetically representing information, and data optically representing information. "Information" is an object that can be represented by data. The "memory" is a device that readably stores data written therein. Examples of the memory include a semiconductor memory, a magnetic memory, and an optical memory. A "computer program" or "computer program element" is a generic term for, from among collections of data representing instructions, a collection designating the procedure of a process. Examples of a computer program or a computer program element include a program for causing a computer to carry out a procedure of a computer game when the program is run by the computer. A "processor" is a device that executes a computer program by performing a process of executing instructions represented by data in the computer program in accordance with a procedure indicated by the computer program, the computer program being a collection of data representing instructions. Examples of a processor include a single CPU (Central Processing Unit) and a collection of plural CPUs.

Examples of a computer or a computer system include a computer provided with an interface with the outside. Examples of an interface with the outside include: an input interface for receiving input information or data from the outside and an output interface for outputting information or data to the outside. Examples of the input interface include a sensor, a button, a keyboard, and a handheld controller with at least one of an acceleration sensor or an infrared position sensor. "To output" information is to represent information represented by data in such a way that information can be perceived by a human. Examples of ways in which information can be perceived by a human include by light, by sound, and by vibration. Examples of outputting information by light include displaying images and blinking of lights. Examples of outputting information by sound include emitting sounds by a speaker and driving a sound structure by solenoid (for example, ringing a bell). Examples of outputting information by vibration include oscillation by an oscillator.

Description will next be given of the present invention.

The present invention provides a game system that has a game terminal for use in a computer game; and a communication apparatus for communicating with the game terminal, the game terminal having: an input interface; a first input instruction receiver that receives, via the input interface, plural input instructions from a participant player who participates in a play of the computer game during the play of the computer game; a weighting factor data storage device that stores, in association with identification data for uniquely identifying each of the plural input instructions, weighting factor data indicating a weighting factor that has been set to each of the plural input instructions; a play result determiner that determines a result of the play based on the value of a weighting factor that has been stored in the weighting factor data storage device in association with identification data of an input instruction received by the first input instruction receiver; a first counter that counts the number of inputs for each input instruction received by the first input instruction receiver and that generates count result data indicating results of the count; and a result data transmitter that transmits the count result data to the communication apparatus, the communication apparatus having: a result data receiver that receives the count result data; an aggregator that aggregates the count results indicated by the count result data to generate aggregated result data; a high-usage input instruction identifier that, based on the aggregated result data, identifies an input instruction for which the number of inputs exceeds a predetermined upper limit standard value, a first setting data transmitter that transmits, to the game terminal, setting data which indicates a weighting factor that less affects a result of the play than a weighting factor that has been set to the input instruction identified by the high-usage input instruction identifier, after associating the setting data with the identified input instruction, and the game terminal further having: a setting data receiver that receives the setting data; and a setting data updater that updates weighting factor data indicating the weighting factor that has been set to the input instruction corresponding to the setting data so that the updated weighting factor data indicates the weighting factor indicated by the setting data.

The "weighting factor" is, for example, the attack power that has been set to an input instruction in advance when the input instruction is input in a fighting game in which an attack is made on an opponent player by an input of an input instruction. Therefore, in the fighting game, an input instruction that is easy to input and for which a greater weighting factor has been set is more advantageous to a player (i.e., it is easy to win).

Generally, in a case in which the game balance of the computer game is disrupted, a player heavily uses an input instruction which is easy to input but for which a weighting factor having a greater effect on a play result has been set, attempting to obtain a better result. According to the game system, a weighting factor can be reset for an easy-to-win input instruction so that the effect on a play result is reduced. Therefore, according to the above game system, the game balance can be adjusted in ways in which the disruption thereof is inhibited.

In the above game system, plural players can participate in a play in the computer game, and the first input instruction receiver may receive in the play of the computer game plural input instructions from the plural participant players of the play.

In the game system, the input interface may be provided with plural operation units, with each operation unit for outputting an operation signal corresponding to an operation and being operated by each of the plural participant players, the game terminal may be provided with a plurality of the first input instruction receivers respectively corresponding to the plural operation units, and the first input instruction receiver may receive an input instruction after identifying the input instruction based on the operation signal output from a corresponding one of the operation units.

In the above game system, the setting data transmitted to the game terminal may indicate the weighting factor that less affects a result of the play of the computer game than the weighting factor that has been set to the corresponding input instruction by the weight corresponding to the difference between the number of inputs of the corresponding input instruction and a predetermined upper limit standard value. According to this game system, the disruption of game balance can be inhibited quickly and accurately.

In the above game system, the communication apparatus may have a low-usage input instruction identifier that identifies, based on the aggregated result data, an input instruction for which the number of inputs falls below a predetermined lower limit standard value, and the first setting data transmitter may transmit, to the game terminal, setting data which indicates a weighting factor that more greatly affects a result of the play than the weighting factor that has been set to the input instruction identified by the low-usage input instruction identifier, after associating the setting data with the identified input instruction. According to the game system, for an input instruction for which a weighting factor inadequate for the difficulty of input has been set, a weighting factor thereof can be reset to a value that fits the difficulty of input.

Furthermore, the present invention provides a game system that has a game terminal for use in a computer game; and a communication apparatus for communicating with the game terminal, the game terminal having: an input interface; a second input instruction receiver that receives, via the input interface, plural input instructions from two participant players who participate in a play of the computer game during the play; a weighting factor data storage device that stores, in association with identification data for uniquely identifying each of the plural input instructions, weighting factor data indicating a weighting factor that has been set to each of the plural input instructions; a play result data generator that generates play result data indicating win or lose for the two players, based on the value of a weighting factor that has been stored in the weighting factor data storage device in association with identification data of an input instruction received by the second input instruction receiver, a second counter that counts, for each input instruction and for each participant player, the number of inputs of an input instruction received by the second input instruction receiver to generate, based on results of the count and on the play result data, data which indicates, for each input instruction, the number of inputs performed by the winner player and which also shows, for each input instruction, the number of inputs performed by the defeated player, as count result data; a result data transmitter that transmits the count result data to the communication apparatus, the communication apparatus having: a result data receiver that receives the count result data; an aggregator that aggregates the count results indicated by the count result data to generate aggregated result data; an easy-to-win input instruction identifier that identifies an input instruction for which the difference in the number of inputs obtained by deducting the number of inputs by the defeated player from the number of inputs by the winner player exceeds an upper limit standard value as an easy-to-win input instruction; a second setting data transmitter that transmits, to the game terminal, setting data which indicates a weighting factor that less affects a result of the play than a weighting factor that has been set to the input instruction identified by the easy-to-win input instruction identifier, after associating the setting data with the identified input instruction, and the game terminal further having: a setting data receiver that receives the setting data; and a setting data updater that updates weighting factor data indicating the weighting factor that has been set to the input instruction corresponding to the setting data so that the updated weighting factor data indicates the weighting factor indicated by the setting data. According to the game system, a weighting factor can be reset only for an input instruction that greatly affects the improvement of a play result from among input instructions which are easy to input but which greatly affect a play result. In other words, the game balance can be adjusted in ways in which the disruption thereof is inhibited reliably.

The above game system may further have a hard-to-win input instruction identifier that identifies, as a hard-to-win input instruction, an input instruction for which the difference in the number of inputs obtained by deducting the number of inputs by the defeated player from the number of inputs by the winner player falls below a lower limit standard value, and the second setting data transmitter may transmit, to the game terminal, setting data which indicates a weighting factor that more greatly affects a result of the play than a weighting factor that has been set to the input instruction identified by the hard-to-win input instruction identifier, after associating the setting data with the identified input instruction. An input instruction for which the number of inputs is smaller is an input instruction by which there is less chance of winning (hard-to-win). In this game system, the weighting factor of an input instruction for which a weighting factor that does not fit the difficulty of input has been set can be reset to a value that fits the difficulty of input.

The present invention provides a communication apparatus for use in a game system of a computer game, the communication apparatus having a communicator for communicating with a game terminal that is provided with: an input interface; a first input instruction receiver that receives, via the input interface, plural input instructions from a participant player who participates in a play of the computer game during the play; a weighting factor data storage device that stores, in association with identification data for uniquely identifying each of the plural input instructions, weighting factor data indicating a weighting factor that has been set to each of the plural input instructions; a play result determiner that determines a result of the play based on the value of a weighting factor that has been stored in the weighting factor data storage device in association with identification data of an input instruction received by the first input instruction receiver; a first counter that counts the number of inputs for each input instruction received by the first input instruction receiver and that generates count result data indicating results of the count; a result data transmitter that transmits the count result data to the communication apparatus; a setting data receiver that receives setting data for resetting the weighting factor data; and a setting data updater that updates weighting factor data indicating the weighting factor that has been set to the input instruction corresponding to the setting data so that the updated weighting factor data indicates the weighting factor indicated by the setting data; a result data receiver that receives, via the communicator, the count result data; an aggregator that aggregates the count results indicated by the count result data to generate aggregated result data; a high-usage input instruction identifier that, based on the aggregated result data, identifies an input instruction for which the number of inputs exceeds a predetermined upper limit standard value; and a first setting data transmitter that transmits, via the communicator, to the game terminal, setting data which indicates the value of a weighting factor that less affects a result of the play than the weighting factor that has been set to the input instruction identified by the high-usage input instruction identifier, after associating the setting data with the identified input instruction, with the setting data for enabling the game terminal to reset the weighting factor data.

According to a game system having this communication apparatus, the game balance can be adjusted in ways in which the disruption of the game balance is inhibited.

The present invention provides a computer program or a computer program element and a computer-readable recording medium having recorded thereon a computer program or a computer program element to be executed in a communication apparatus for use in a game system of a computer game, in which the communication apparatus has a communicator for communicating with a game terminal that is provided with: an input interface; a first input instruction receiver that receives, via the input interface, plural input instructions from a participant player who participates in a play of the computer game during the play; a weighting factor data storage device that stores, in association with identification data for uniquely identifying each of the plural input instructions, weighting factor data indicating a weighting factor that has been set to each of the plural input instructions; a play result determiner that determines a result of the play based on the value of a weighting factor that has been stored in the weighting factor data storage device in association with identification data of an input instruction received by the first input instruction receiver; a first counter that counts the number of inputs for each input instruction received by the first input instruction receiver and that generates count result data indicating results of the count; a result data transmitter that transmits the count result data to the communication apparatus; a setting data receiver that receives setting data for resetting the weighting factor data; and a setting data updater that updates weighting factor data indicating a weighting factor that has been set to the input instruction corresponding to the setting data so that the updated weighting factor data indicates the weighting factor indicated by the setting data, and the computer program or the computer program element causes the communication apparatus to execute: a result data receiving process of receiving, via the communicator, the count result data; an aggregating process of aggregating the count results indicated by the count result data to generate aggregated result data; a high-usage input instruction identifying process of, based on the aggregated result data, identifying an input instruction for which the number of inputs exceeds a predetermined upper limit standard value; and a first setting data transmitting process of transmitting, via the communicator, to the game terminal, setting data which indicates a weighting factor that less affects a result of the play than a weighting factor that has been set to the input instruction identified in the high-usage input instruction identifying process, after associating the setting data with the identified input instruction, with the setting data for enabling the game terminal to reset the weighting factor data.

According to a game system having a communication apparatus executing this computer program or computer program element, the game balance can be adjusted in ways in which the disruption thereof is inhibited. A data carrier can be provided instead of a recording medium.

The present invention provides a game terminal for use in a game system of a computer game, the game terminal having: an input interface; a first input instruction receiver that receives, via the input interface, plural input instructions from a participant player who participates in a play of the computer game during the play; a weighting factor data storage device that stores, in association with identification data for uniquely identifying each of the plural input instructions, weighting factor data indicating a weighting factor that has been set to each of the plural input instructions; a play result determiner that determines a result of the play based on the value of a weighting factor that has been stored in the weighting factor data storage device in association with identification data of an input instruction received by the first input instruction receiver; a first counter that counts the number of inputs for each input instruction received by the first input instruction receiver and that generates count result data indicating results of the count; a result data transmitter that transmits the count result data to the communication apparatus that is provided with: a result data receiver that receives the count result data; an aggregator that aggregates the count results indicated by the count result data to generate aggregated result data; a high-usage input instruction identifier that, based on the aggregated result data, identifies an input instruction for which the number of inputs exceeds a predetermined upper limit standard value; and a first setting data transmitter that transmits, to the game terminal, setting data which indicates a weighting factor that less affects a result of the play than a weighting factor that has been set to the input instruction identified by the high-usage input instruction identifier, after associating the setting data with the identified input instruction; a setting data receiver that receives the setting data from the communication apparatus; and a setting data updater that updates weighting factor data indicating the weighting factor that has been set to the input instruction corresponding to the setting data so that the updated weighting factor data indicates the weighting factor indicated by the setting data.

According to a game system having this game terminal, the game balance can be adjusted in ways in which the disruption thereof is inhibited.

The present invention provides a computer program or a computer program element and a computer-readable recording medium having recorded thereon a computer program or a computer program element for causing a game terminal for use in a game system of a computer game to execute: a first input instruction receiving process of receiving, via an input interface of the game terminal, plural input instructions from a participant player who participates in a play of the computer game during the play; a play result determining process of determining a result of the play based on the value of a weighting factor that has been stored in a weighting factor data storage device of the game terminal in association with identification data of an input instruction received in the first input instruction receiving process, the weighting factor data storage device having stored, in association with identification data for uniquely identifying each of the plural input instructions, weighting factor data indicating a weighting factor that has been set to each of the plural input instructions; a first counting process that counts the number of inputs for each input instruction received in the first input instruction receiving process and that generates count result data indicating results of the count; a result data transmitting process of transmitting the count result data to the communication apparatus that is provided with: a result data receiver that receives the count result data; an aggregator that aggregates the count results indicated by the count result data to generate aggregated result data; a high-usage input instruction identifier that, based on the aggregated result data, identifies an input instruction for which the number of inputs exceeds a predetermined upper limit standard value; and a first setting data transmitter that transmits, to the game terminal, setting data which indicates a weighting factor that less affects a result of the play than a weighting factor that has been set to the input instruction identified by the high-usage input instruction identifier, after associating the setting data with the identified input instruction; a setting data receiving process of receiving the setting data from the communication apparatus; and a setting data updating process of updating weighting factor data indicating the weighting factor that has been set to the input instruction corresponding to the setting data so that the updated weighting factor data indicates the weighting factor indicated by the setting data.

According to a game system having a game terminal executing this computer program or computer program element, the game balance can be adjusted in ways in which the disruption thereof is inhibited. A data carrier can be provided instead of a recording medium.

The present invention provides a game apparatus for a computer game, having: an input interface; a first input instruction receiver that receives, via the input interface, plural input instructions from a participant player who participates in a play of the computer game during the play; a weighting factor data storage device that stores, in association with identification data for uniquely identifying each of the plural input instructions, weighting factor data indicating a weighting factor that has been set to each of the plural input instructions; a play result determiner that determines a result of the play based on the value of a weighting factor that has been stored in the weighting factor data storage device in association with identification data of an input instruction received by the first input instruction receiver; a first counter that counts the number of inputs for each input instruction received by the first input instruction receiver and that generates count result data indicating results of the count; an aggregator that aggregates the count results indicated by the count result data to generate aggregated result data; a high-usage input instruction identifier that, based on the aggregated result data, identifies an input instruction for which the number of inputs exceeds a predetermined upper limit standard value; and a resetter that updates weighting factor data indicating the weighting factor that has been set to the input instruction identified by the high-usage input instruction identifier, so that the updated weighting factor data indicates a weighting factor that less affects a result of the play than the weighting factor set to the identified input instruction.

According to this game apparatus, the game balance can be adjusted in ways in which the disruption thereof can be inhibited. This game apparatus may be a game terminal or may be a game apparatus capable of communicating with each of plural game terminals.

The present invention provides a computer program or a computer program element and a computer-readable recording medium having recorded thereon a computer program or a computer program element for causing a game apparatus of a computer game to execute: a first input instruction receiving process of receiving, via an input interface of the game apparatus, plural input instructions from a participant player who participates in a play of the computer game during the play; a play result determining process of determining a result of the play based on the value of a weighting factor that has been stored in a weighting factor data storage device of the game apparatus in association with identification data of an input instruction received in the first input instruction receiving process, the weighting factor data storage device having stored, in association with identification data for uniquely identifying each of the plural input instructions, weighting factor data indicating a weighting factor that has been set to each of the plural input instructions; a first counting process of counting the number of inputs for each input instruction received in the first input instruction receiving process and that generates count result data indicating results of the count; an accumulating process of accumulating the count results indicated by the count result data to generate aggregated result data; a high-usage input instruction identifying process of, based on the aggregated result data, identifying an input instruction for which the number of inputs exceeds a predetermined upper limit standard value; and a resetting process of updating weighting factor data indicating the weighting factor that has been set to the input instruction identified in the high-usage input instruction identifying process, so that the updated weighting factor data indicates a weighting factor that less affects a result of the play than the weighting factor set to the identified input instruction.

According to a game system having a game apparatus executing this computer program or computer program element, the game balance can be adjusted in ways in which the disruption thereof is inhibited. A data carrier can be provided instead of a recording medium.

The computer program or computer program element in the present invention can be executable on a computer or on a computer system, includes instructions (software code portions) for causing the processor of the computer or the computer system to execute a process according to the present invention, when it is executed on a computer or on a computer system, and can cause a general-purpose computer or computer system to serve as a computer or a computer system according to the present invention. Such a computer program or computer program element can be distributed, with data loadable into a memory of a computer system (i.e., computer program) being recorded on a recording medium such as a CD-ROM or a diskette or other types of recording media. Also, the above data carrier includes a recording medium having recorded thereon a computer program according to the present invention. Furthermore, the data carrier may be a data connection or transmission medium for transmitting a signal indicating a computer program according to the present invention, and includes, for example, a telephone line, a wireless communication line, and an electric communication line such as the Internet.

EFFECTS OF THE INVENTION

According to the present invention, it is possible to identify, in a computer game, an input instruction which is easy to input but for which a weighting factor that greatly affects a play result has been set, to change the weighting factor so as to reduce the effect on a play result.

BRIEF DESCRIPTION OF THE DRAWINGS

FIG. 4 is a block diagram showing an electrical configuration of the game terminal.

FIG. 5 is a diagram showing a configuration of an input instruction counter in the game terminal.

FIG. 17 is a flowchart showing a procedure of an update process in the communication apparatus.

FIG. 18 is a diagram showing an example of details in a setting table in the communication apparatus.

FIG. 19 is a diagram showing an example of details in an aggregation table in the communication apparatus.

FIG. 20 is a diagram for describing a process of updating a setting table in the communication apparatus.

FIG. 21 is a diagram showing an example of details in a setting table in the communication apparatus.

BEST MODE FOR CARRYING OUT THE INVENTION

In the following, description will be given of a preferred embodiment of the present invention with reference to the drawings. The specific configurations described below are merely examples, and the present invention encompasses various embodiments obtained by modifying the specific configurations within its scope.

1. Configuration of Game System

Figure 1:
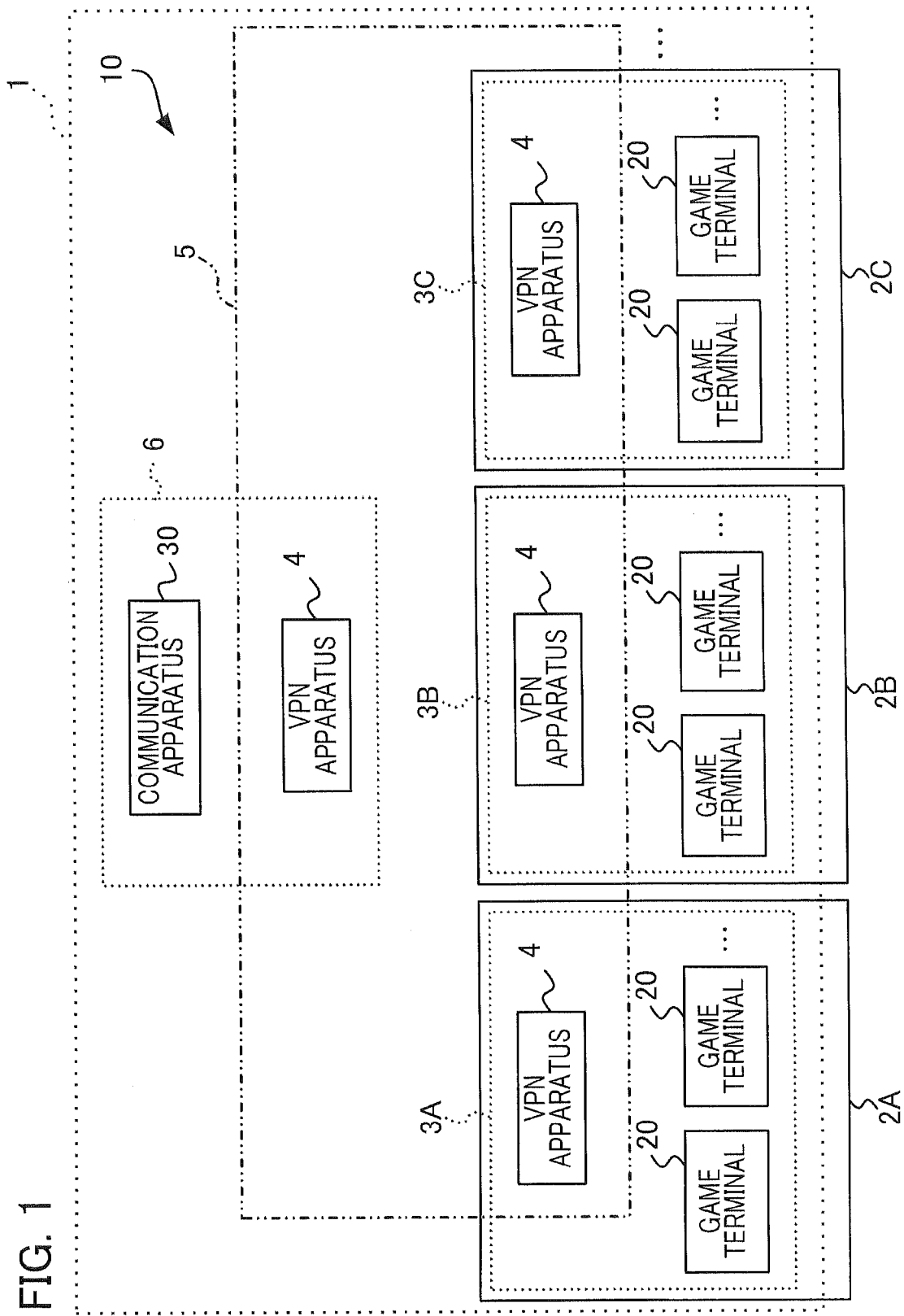
FIG. 1 is a block diagram showing a configuration of a game system according to an embodiment of the present invention.

FIG. 1 is a block diagram showing a configuration of a game system 10 according to an embodiment of the present invention. Game system 10 is a game system for a particular computer game (hereinafter, this will be referred to as a "first game"). The first game is a type of a character operation game, and is a wrestling game in the play of which two players each operate each character by inputting an input instruction, to have the character fight with a character of an opponent player and each player fights to win or lose against the opponent player. Each character is an imaginary entity resembling a human. In the following description, from among two players who will be opponent players for each other, one will be called "Player A" and the other will be "Player B".

Game system 10 is a network-type game system and has plural game terminals 20, each belonging to the Internetwork 1 as a terminal node, and a communication apparatus 30 belonging to the Internetwork 1 as a terminal node.

Game terminal 20 is a game terminal for the first game. Plural game terminals 20 each belong to one of plural LANs (Local Area Networks) 3 (3A, 3B, 3C, ...) as a terminal node. LAN 3 is a network belonging to the Internetwork 1 as a node. Plural LANs 3 are provided at plural game places 2 (2A, 2B, 2C, ...), respectively. Belonging to LAN 3 is a VPN (Virtual Private Network) apparatus 4 as a node. VPN apparatus 4 belonging to LAN 3 belongs to a VPN 5 as a terminal node. VPN 5 is a network virtually created on the Internetwork 1.

Communication apparatus 30 is a computer, belongs to LAN 6 as a terminal node, and adjusts the game balance. LAN 6 is a network belonging to the Internetwork 1 as a node, and is provided at a place different from any of the plural game places 2. VPN apparatus 4 belongs to LAN 6 as a node. VPN apparatus 4 belongs to VPN 5 as a terminal node. Communication between each game terminal 20 and communication apparatus 30 is performed via VPN 5.

2. Configuration of Game Terminal

Figure 2:
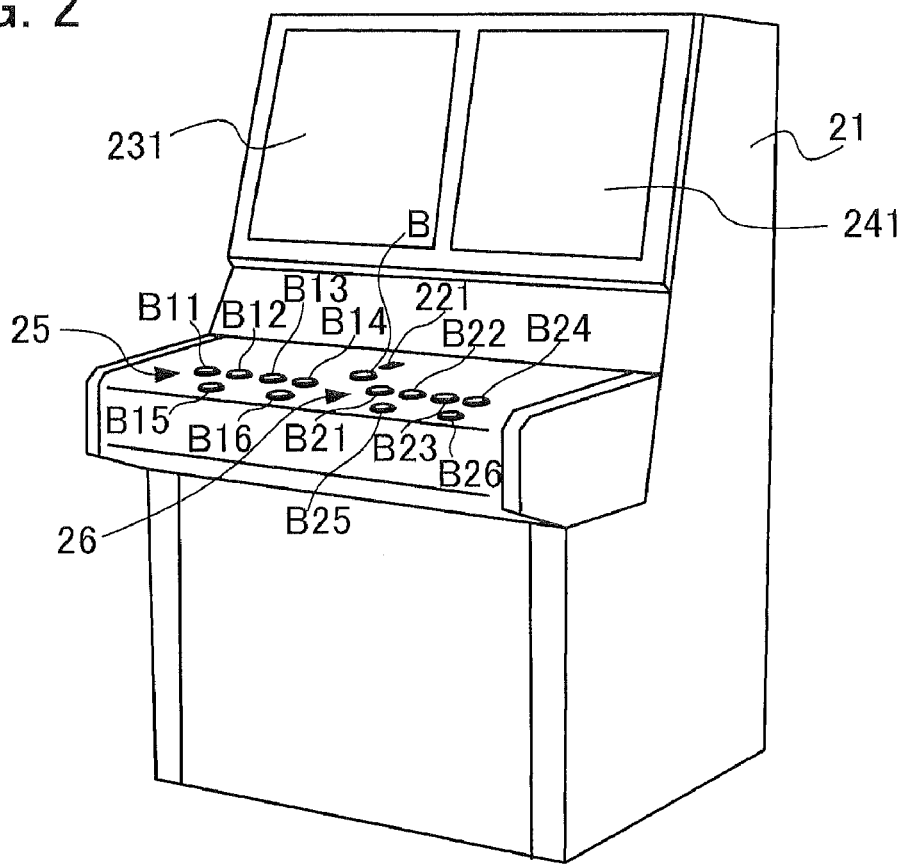
FIG. 2 is a perspective view showing an external view of a game terminal included in the game system.

FIG. 2 is a perspective view showing an external view of game terminal 20. As shown in this figure, provided on the surface of a body 21 of game terminal 20 is a coin acceptance slot 221, screens 231,241, start buttons B, A buttons B11,B21, B buttons B12,B22, C buttons B13,B23, D buttons B14,B24, left buttons B15,B25, and right buttons B16,B26. The A to D buttons, left buttons, and right buttons are all operation buttons operated during the play of the first game. Operation buttons B11 to B16 are operated by Player A, and operation buttons B21 to B26 are operated by Player B.

The play of the first game is started when one or plural pieces of coins (for example, hard currency) having monetary value corresponding to the fees for a single play of the first game is inserted into coin acceptance slot 221, and the start button B is pressed down thereafter. During the play of the first game, Player A, while viewing screen 231, operates operation buttons B11 to B16, and Player B, while viewing screen 241, operates operation buttons B21 to B26.

Figure 3:
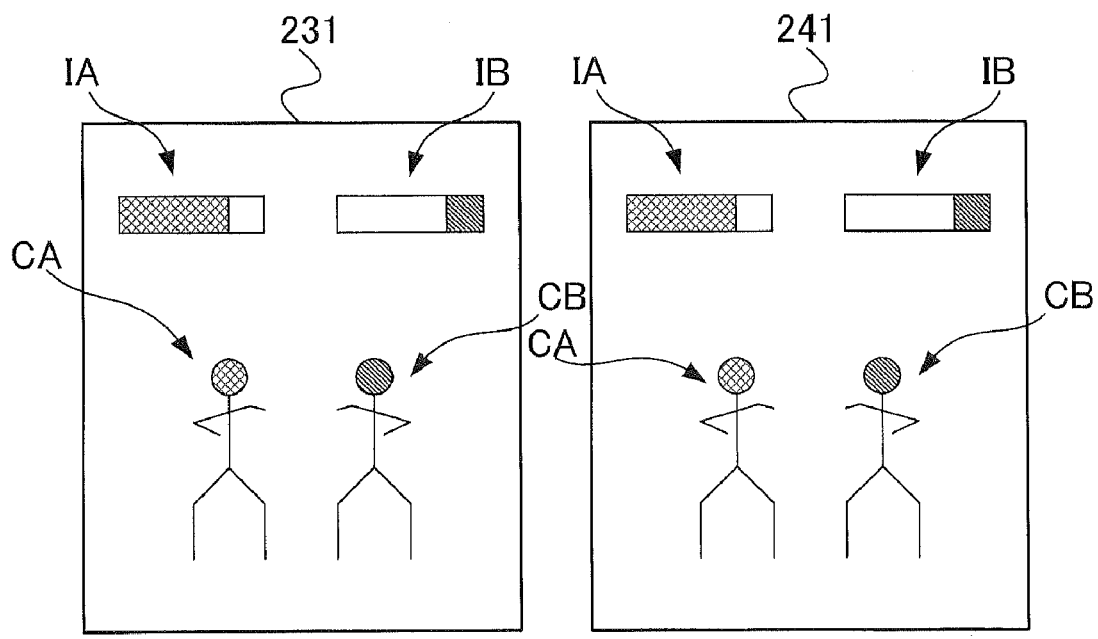
FIG. 3 is a diagram showing an example of an image displayed on the game terminal.

FIG. 3 is a diagram showing an example of an image displayed on screens 231 and 241 during the play of the first game. As shown in this figure, the images of a character CA of Player A and a character CB of Player B, a bar indicator IA, and a bar indicator IB are displayed on each screen. Bar indicator IA indicates the remaining power of character CA, and bar indicator IB that of character CB.

In the play of the first game, Player A operates operation buttons B15 and B16 to move character CA in the horizontal direction of the figure, and operates character CA by operating operation buttons B11 to B14 to enter input instructions. On the other hand, Player B operates operation buttons B25 and B26 to move character CB in the horizontal direction of the figure, and operates character CB by operating operation buttons B21 to B24 to enter input instructions. For example, in a case in which Player A operates operation buttons B11 to B14 to enter an input instruction, the player's character CA performs an attack corresponding to the input instruction (for example, left middle round kick), and if this attack is performed at the effective fighting distance and timing, the damage depending on the attack is given to character CB, causing the remaining power of character CB to drop by the amount corresponding to the damage it received.

FIG. 4 is a block diagram showing an electrical configuration of game terminal 20. As shown in the figure, game terminal 20 has a coin hopper 22, a first display unit 23, a second display unit 24, a first operation unit 25 and a second operation unit 26 as input interfaces, a communication interface (communicator) 27, a storage device 28, and a processor 29. Coin hopper 22 distinguishes coins inserted from a coin acceptance slot 221, and the hopper accepts a coin if the coin is of a predetermined type and supplies a coin acceptance signal.

First display unit 23 displays an image represented by supplied image data on screen 231. Second display unit 24 displays an image represented by supplied image data on screen 241. In other words, each display unit is an outputter that outputs information to the outside of game terminal 20 and specifically is a display such as a CRT (Cathode Ray Tube). The present embodiment may be modified to a mode in which a video projector is used instead of a display or to a mode in which one display serves as the two display units.

First operation unit 25 is provided with operation buttons B11 to B16 (FIG. 2), and, when one of these operation buttons is pressed down, outputs an operation signal unique to the pressed operation button. Second operation unit 26 is provided with operation buttons B21 to B26 (FIG. 2), and, when one of these operation buttons is pressed down, outputs an operation signal unique to the pressed operation button. In other words, each operation unit is an input unit (input interface) for inputting information from the outside of game terminal 20, and, when operated by a player, outputs an operation signal indicating the content of the operation. On the other hand, start button B, when pressed down, outputs a start signal. The present embodiment may be modified in such a way that something other than a button (for example, a pedal) may be used for operating a character.

Communication interface 27 is capable of transmitting data to, and receiving from, VPN apparatus 4, and transmits data to communication apparatus 30 and receives data from communication apparatus 30 via VPN 5 in coordination with processor 29. That is, communication interface 27 and processor 29 serve as an outputter for outputting data to the outside and an input receiver for receiving data input from the outside.

Storage device 28 has a memory area and retains (stores) data written in this memory area. The memory area of storage device 28 is divided into a volatile area R1 for which power is required for retaining the written data and a non-volatile area R2 for which power is not required. Volatile area R1 is a terminal-side data retainer for retaining written data in a readable way. Non-volatile area R2 is further divided into a non-rewritable area R21 in which the memory content is non-rewritable and a rewritable area R22 in which the memory content is rewritable. The configuration of storage device 28 can be freely determined, but in the present embodiment, the memory area of RAM (Random Access Memory) is used as volatile area R1 the memory area of ROM (Read Only Memory) as non-rewritable area R21, and the memory area of a hard disk as rewritable area R22.

Reserved in volatile area R1 is input instruction counters TA and TB. Input instruction counter TA is a data table which shows the number of inputs for each input instruction input by Player A in the latest play. Input instruction counter TB is a data table which shows the number of inputs for each input instruction input by Player B in the latest play. The configuration of each input instruction counter is such as shown in FIG. 5, and each record stores identification data, and data of the number of inputs indicating the number of times an input instruction identified by the identification data was input. The identification data is data for individually identifying each of predetermined plural input instructions.

In volatile area RE play result data PR indicating the latest play result and other temporary data are written. The play result is a play result of the first game, and is either a win of Player A (a loss by Player B) or a loss by Player A (a win of Player B). Examples of other temporary data include data indicating the position or orientation of each character and data indicating the remaining power of a character.

Figures 6, 7:
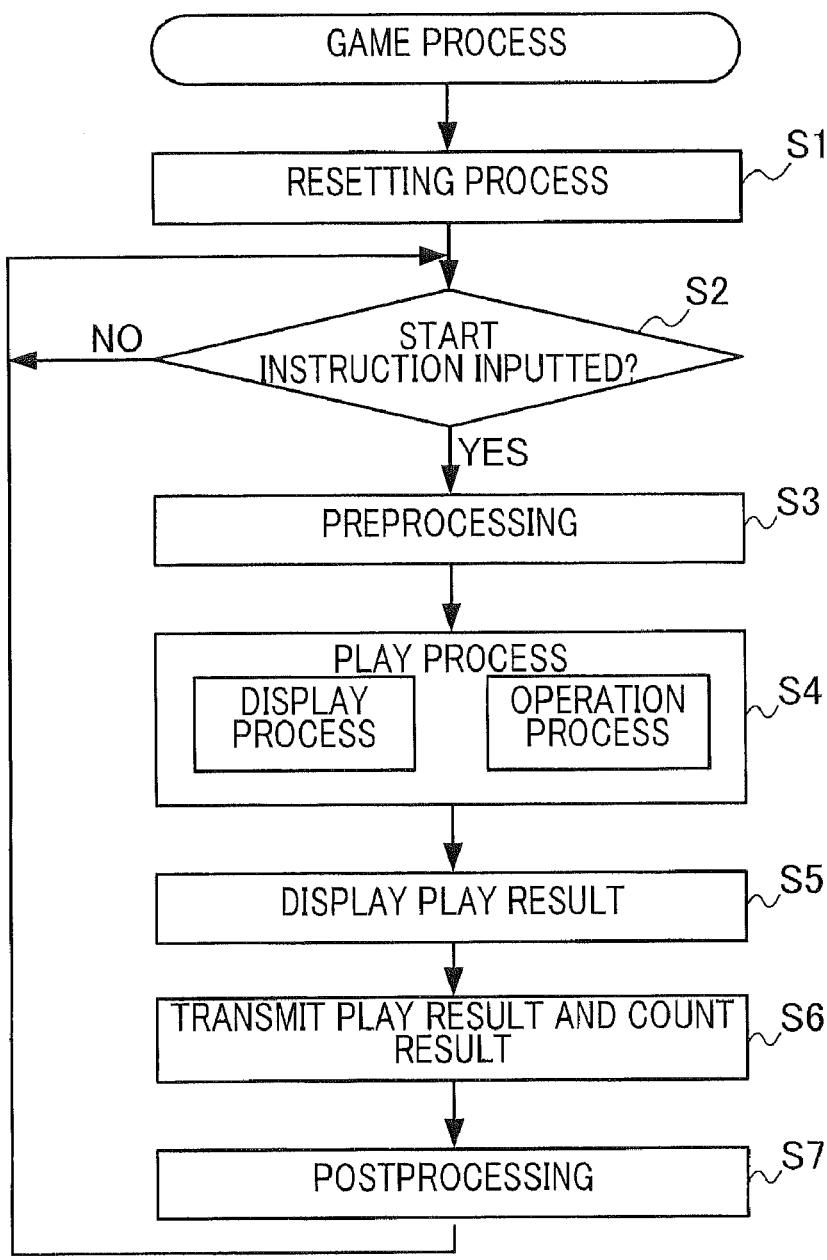
FIG. 6 is a diagram showing a configuration of an input instruction table in the game terminal.
FIG. 7 is a flowchart showing a procedure of a game process in the game terminal.

Reserved in rewritable area R22 is, for each of predetermined plural input instructions, an input instruction table CT that sets an input operation thereof and a weighting factor thereof. That is, storage device 28 serves as a weighting factor data storage device that stores plural sets of weighting factor data, each indicating a weighting factor, respectively, in association with plural sets of identification data for input instructions. The configuration of input instruction table CT is as shown in FIG. 6, and has the same number of records as the number of the predetermined plural input instructions. Each record corresponds to each input instruction. Stored in each record are identification data of an input instruction, input operation data indicating an input operation of this input instruction, and weighting factor data indicating a weighting factor of this input instruction. A weighting factor indicated by weighting factor data is set to a design value at the commencement of the operation of game system 10.

The input operation of an input instruction is an operation necessary for inputting the input instruction. When the input operation of an input instruction is an operation of pressing the A button, C button, B button, and D button in sequence, input operation data corresponding to this input instruction will be data indicating an operation of a sequence, A→C→B→D. On the other hand, a weighting factor of an input instruction is a weighting factor given to a character of a player who has input an input instruction when an attack corresponding to the input instruction hits a character of an opponent player, and indicates the amount of damage which the character of the opponent player receives. Therefore, in the present embodiment, the weighting factor is attack power given to a character of a player who has input an input instruction, and the remaining power of a character of an opponent player which was attacked drops by the amount corresponding to the weighting factor set to the input instruction that was input. In the present embodiment, description will be given assuming that the value indicated by the weighting factor set to the input instruction that was input and the attack power of a character given by this input instruction (i.e., damage amount for a character of an opponent player) are in the same unit and are the same amount.

Reserved in volatile area R1 are operation buffers BA and BB for temporarily retaining the content of operation. In operation buffer BA, data indicating operations using first operation unit 25 are stored in the order of operations performed. For example, in a case in which A button B11, C button B13, B button B12, and D button B14 are pressed down sequentially, data indicating an operation sequence of A→C→B→D is retained in operation buffer BA. Similarly, in operation buffer BB, data indicating operations using second operation unit 26 are stored in the order of operations performed. For example, in a case in which A button B21, C button B23, B button B22, and D button B24 are pressed down sequentially, data indicating an operation sequence of A→C→B→D is retained in operation buffer BB.

In non-rewritable area R21, there is retained a computer program P1 executed by processor 29. Processor 29, when power (not shown) is turned on, reads computer program P1 from non-rewritable area R21 for execution. By this execution, processor 29 performs a game process. The power (not shown) of game terminal 20 is usually turned on before the start of operating hours for game place 2 and turned off after the end of operating hours.

3. Operation of Game Terminal

FIG. 7 is a flowchart showing a procedure of a game process. In the game process, processor 29 first performs a resetting process (update process) of resetting (updating) a weighting factor (S1). Although this will be described later in detail, in the resetting process, processor 29 transmits to communication apparatus 30 setting data for resetting a weighting factor.

Subsequently, processor 29 determines whether a start instruction instructing the start of a play of the first game has been input (S2). Specifically, based on a signal from coin hopper 22 and a start signal from start button B, processor 29 determines whether start button B was pressed down after one or plural pieces of coins having monetary value corresponding to the fees for a single play of the first game is inserted into coin acceptance slot 221. In a case in which a result of the determination is NO, the process returns to Step S2.

In a case in which a result of the determination in Step S2 is YES, processor 29 performs a preprocessing prior to the start of the play (S3). Specifically, processor 29 reserves, in volatile area R1, areas for input instruction counters TA, TB and operation buffers BA, BB. Processor 29 then performs a play process of implementing a play of the first game (S4). In the play process, processor 29 supplies image data to the first display unit 23 and to the second display unit 24, and executes a display process of causing an image displayed on screen 231 and screen 241, the image including character CA, character CB, bar indicator IA, and bar indicator IB as shown in FIG. 3, and an operation process of controlling the position and orientation of the character based on an operation of player, the display process and the operation process being executed in parallel.

Figure 8A:
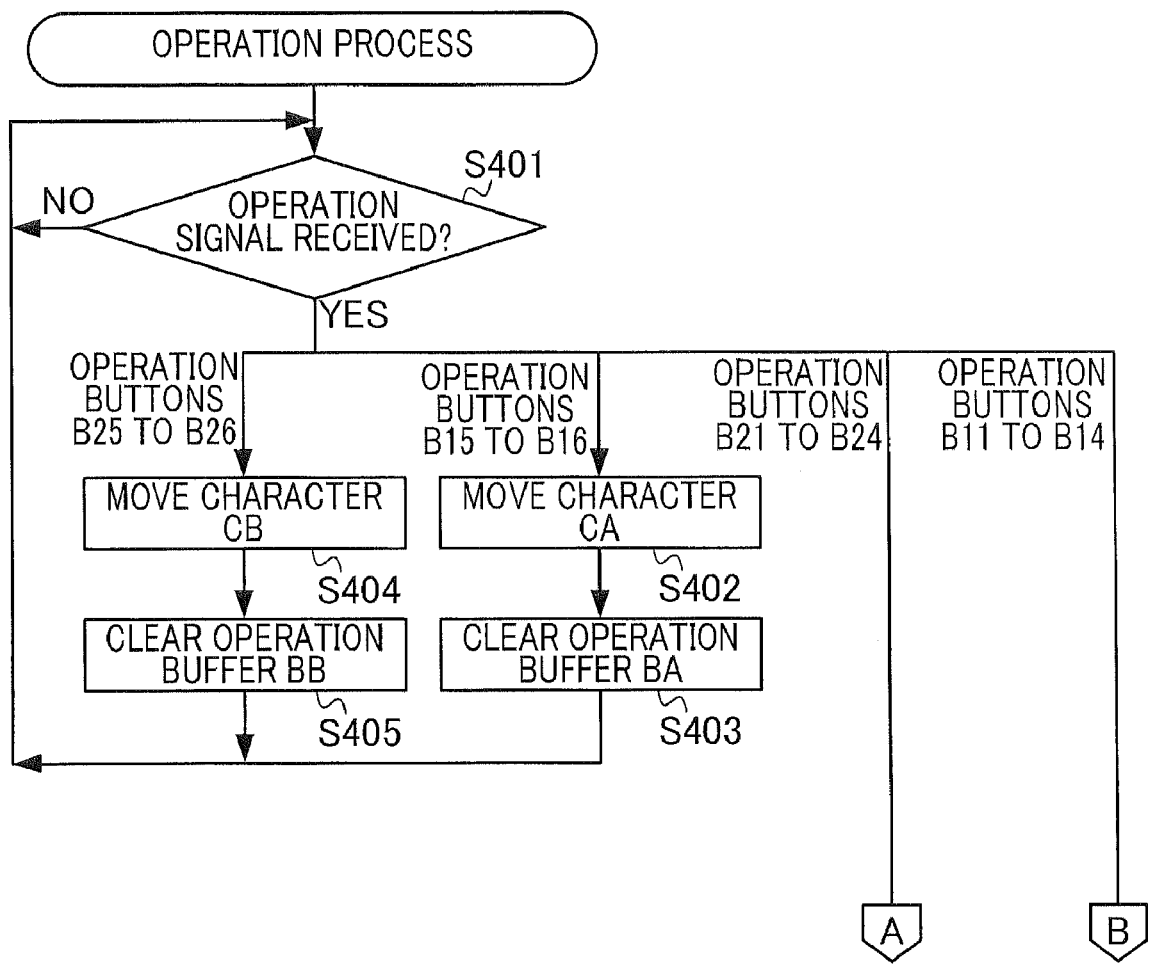
FIG. 8A is a flowchart showing a procedure of an operation process in the game terminal.
Figure 8B:
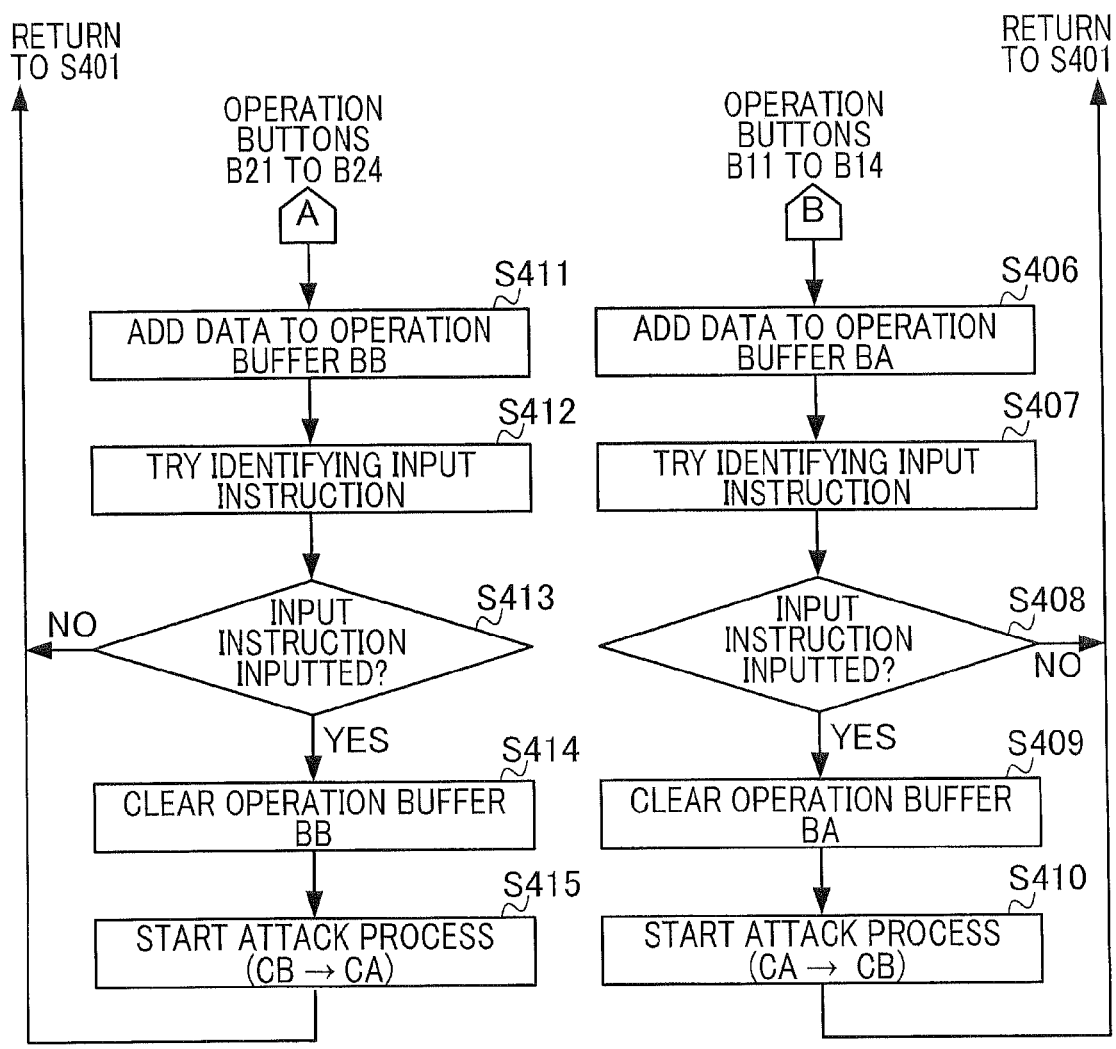
FIG. 8B is a flowchart showing a procedure of an operation process in the game terminal.

Each of FIGS. 8A and 8B is a flowchart showing a procedure of the operation process. In the operation process, processor 29 first determines whether it has received an operation signal (S401). In a case in which a result of the determination is NO, the process returns to Step S401. In other words, processor 29 waits until it receives an operation signal. In a case in which a result of the determination in Step S401 is YES, the process thereafter varies depending on the outputter of the operation signal.

In a case in which the outputter of an operation signal is either operation button B15 or B16 (FIG. 8A), processor 29 moves character CA in the horizontal direction of FIG. 3 (S402). That is, character CA moves to the left direction in a case in which the outputter of the operation signal is left button B15, and to the right direction in a case in which the outputter of the operation signal is right button B16. Subsequently, processor 29 clears operation buffer BA (S403). Hereinafter, the process returns to Step S401.

In a case in which the outputter of the operation signal is either operation button B25 or B26 (FIG. 8A), processor 29 moves character CB to the horizontal direction of FIG. 3 (S404). That is, character CB moves to the left direction in a case in which the outputter of the operation signal is left button B25, and to the right direction in a case in which the outputter of the operation signal is right button B26. Subsequently, processor 29 clears operation buffer BB (S405). Hereinafter, the process returns to Step S401.

In a case in which the outputter of the operation signal is one of operation buttons B11 to B14 (FIG. 8B), processor 29 adds data indicating an operation represented by this operation signal to operation buffer BA (S406). Subsequently, processor 29 tries a process of identifying the input instruction that was input (S407). Specifically, processor 29 refers to input instruction table CT, checks whether there is any input instruction for which the sequence of operations indicated by data retained in operation buffer BA has been set as an input operation, and, if there is, reads identification data thereof. In other words, processor 29, during a play of a computer game, serves as a second input instruction receiver that receives input of input instructions from two participant players who participate in the play.

Subsequently, processor 29 determines whether an input instruction was input (S408). A result of the determination changes to YES in a case in which, in Step S407, identification data is read, and changes to NO in a case in which identification data is not read. In a case in which a result of the determination in Step S408 is NO, the process returns to Step S401.

In a case in which a result of the determination in Step S408 is YES, processor 29 clears operation buffer BA (S409), and performs an attack process of character CA against character CB (S410). The content of this attack process will depend on the input instruction that was input. Subsequently, the process returns to Step S401.

In a case in which the outputter of the operation signal is one of operation buttons B21 to B24 (FIG. 8B), processor 29 adds data indicating an operation indicated by the operation signal to operation buffer BB (S411). The process thereafter (S412 to S415) is the same as the process of Steps S407 to S410. However, operation buffer BB is used instead of operation buffer BA; and an attack process of character CB against character CA is performed instead of the attack process from character CA against character CB. Thus, processor 29 waits until an input instruction is received, and when an input instruction is received, an attack corresponding to the input instruction is rendered from a character of a player who has input the input instruction against a character of an opponent player.

Figure 9:
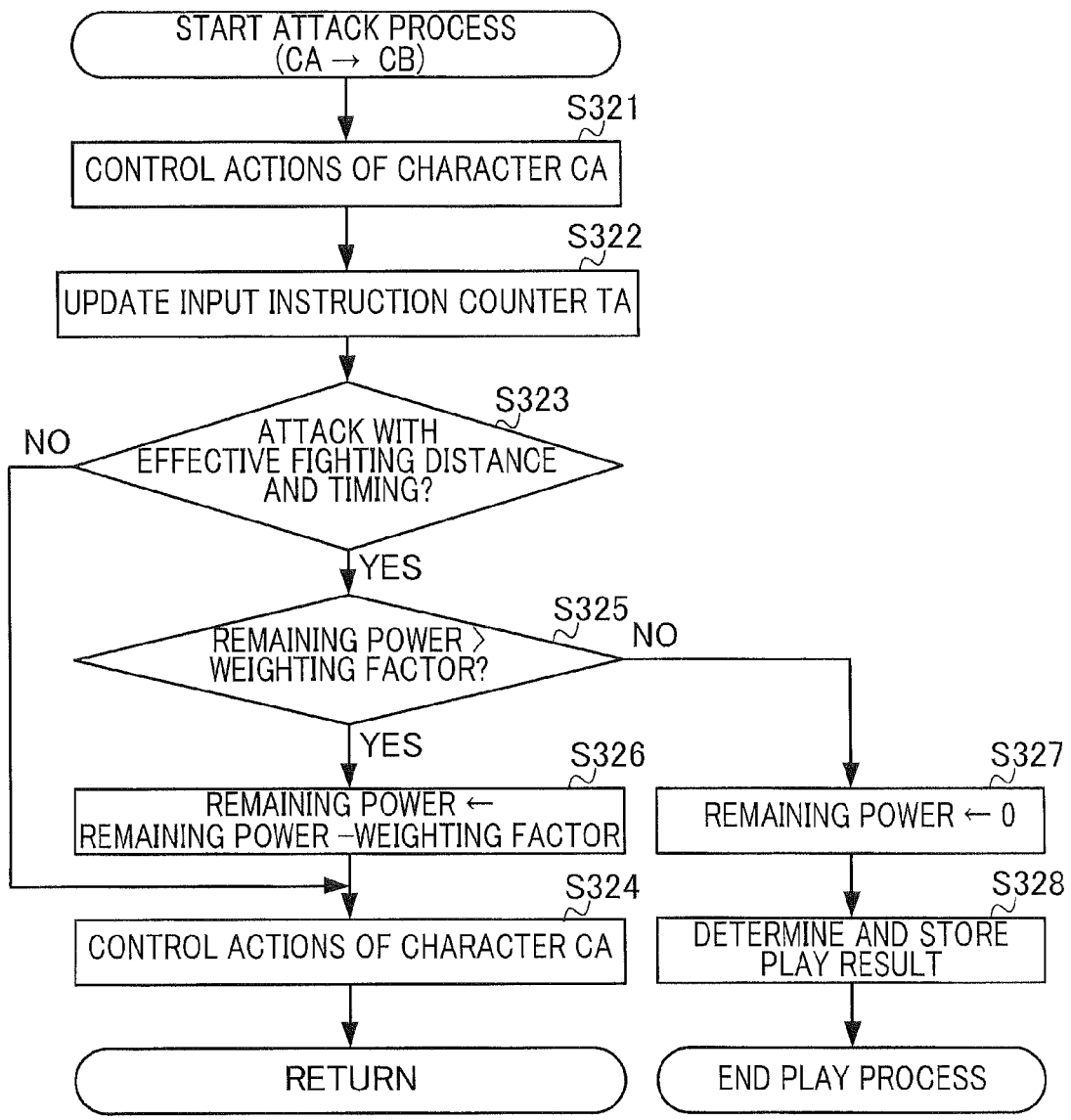
FIG. 9 is a flowchart showing a procedure of an attack process.
Figure 10:
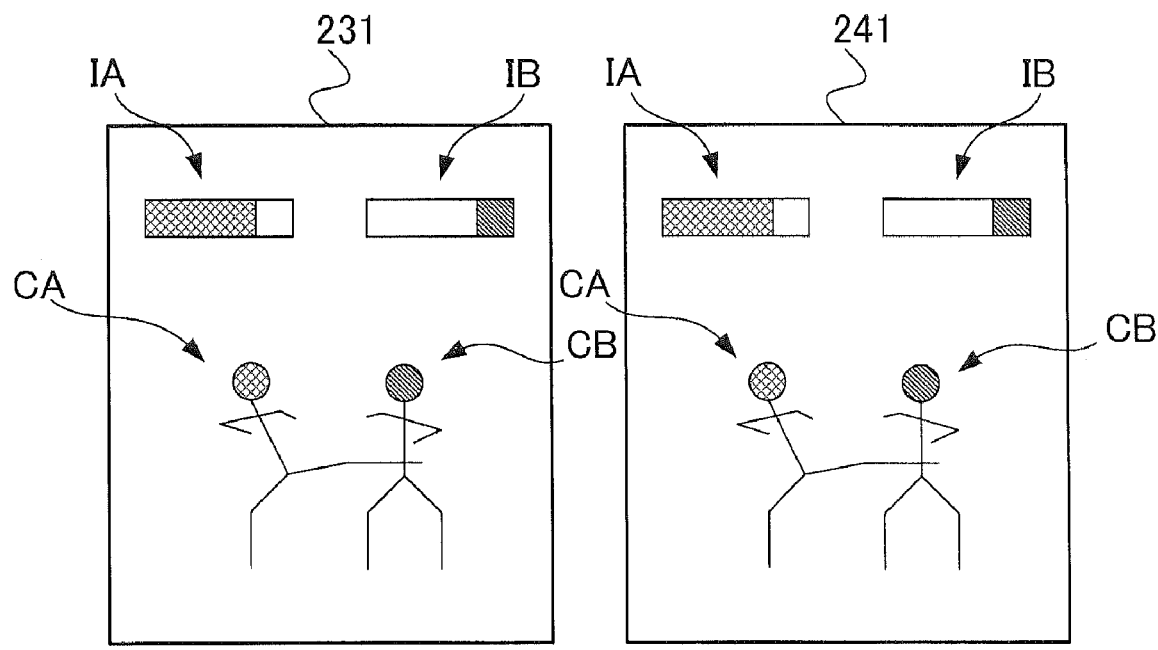
FIG. 10 is a diagram showing an example of an image displayed at the game terminal.

FIG. 9 is a flowchart showing a procedure of an attack process from character CA against character CB. In the attack process, processor 29 controls actions of character CA (S321). Specifically, processor 29 causes character CA to perform an attack operation corresponding to the input instruction that was input. As a result, an image such as is shown in FIG. 10, for example, is displayed on first display unit 23 and second display unit 24. An attack operation is determined in advance for each input instruction.

Subsequently, processor 29 updates input instruction counter TA (S322). In this update, in a case in which the identification data read in Step S407 is stored in input instruction counter TA, data of the number of inputs corresponding to this identification data is updated so that the number of inputs indicated by the data of the number of inputs is incremented by 1. In a case in which the identification data read in Step S407 is not stored, a record is added to input instruction counter TA, the identification data, and data of the number of inputs indicating 1 is stored in this record. That is, processor 29 waits until an input instruction is input by Player A and counts the number of inputs of an input instruction performed by Player A for each input instruction.

Processor 29 then determines whether the attack was performed at the effective fighting distance and timing (S323). The effective fighting distance and timing is determined for each input instruction. In a case in which a result of the determination is NO, processor 29 controls actions of character CA (S324). Specifically, processor 29 causes character CA to perform an after-attack operation corresponding to the input instruction. As a result, an image such as that shown in FIG. 3 is displayed on screens 231 and 241. An after-attack operation is determined in advance for each input instruction.

On the other hand, in a case in which a result of the determination in Step S323 is YES, processor 29 refers to input instruction table CT to determine whether the remaining power of character CB exceeds the weighting factor that has been set to the input instruction that was input (S325). In a case in which a result of the determination is YES, processor 29 reduces the remaining power of character CB by the weight corresponding to the weighting factor that has been set to the input instruction (S326). Specifically, processor 29 updates data indicating the remaining power of character CB stored in volatile area R1 so that the data shows a value after the weight corresponding to the weighting factor is deducted from the remaining power.

Figure 11:
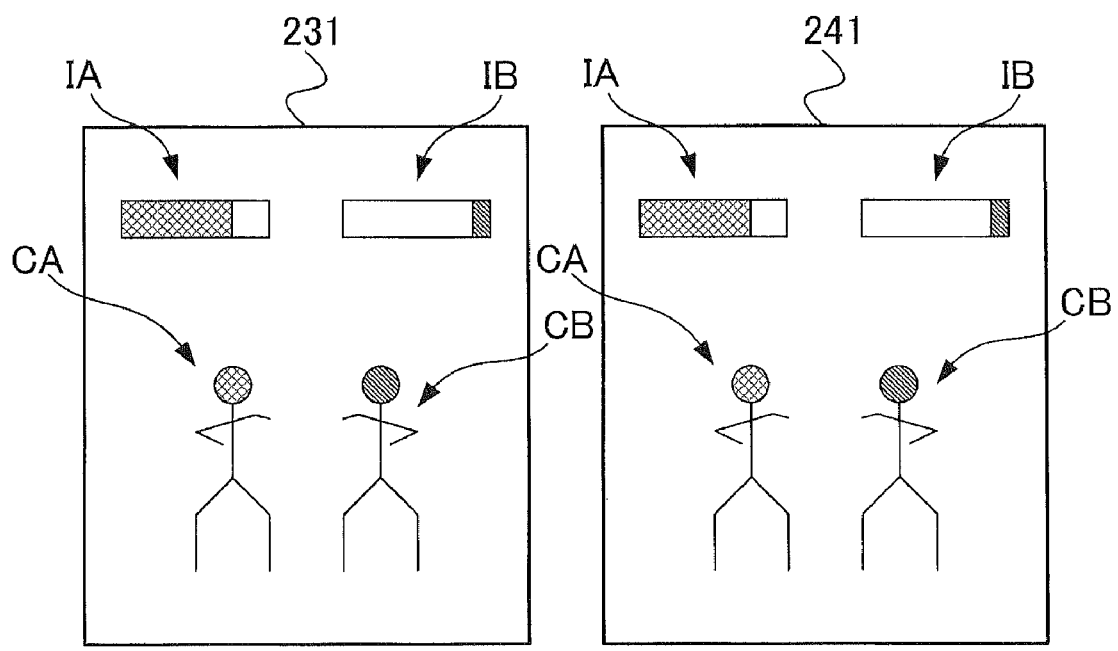
FIG. 11 is a diagram showing an example of an image displayed at the game terminal.

Processor 29 then controls the actions of character CA (S324). As a result, an image such as that shown in FIG. 11, for example, is displayed on screens 231 and 241. Players A and B can know from this image that the remaining power of character CB has decreased. When the process of Step S324 ends, an attack process of character CA against character CB ends.

Figure 12:
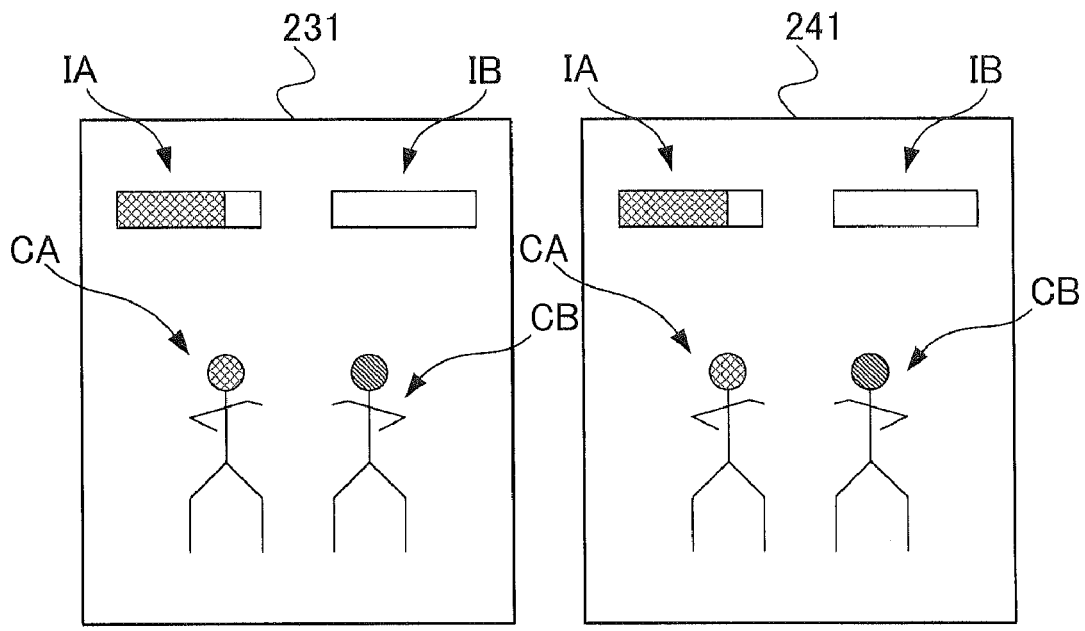
FIG. 12 is a diagram showing an example of an image displayed at the game terminal.

On the other hand, in a case in which a result of the determination Step in S325 is NO, processor 29 changes the remaining power of character CB to 0 (S327), to determine and store a play result (S328). Specifically, processor 29 generates data (win or loss data) indicating the win of Player A (the loss by Player B), to write it into volatile area R1 as play result data PR. As a result, an image such as that shown in FIG. 12, for example, is displayed on screens 231 and 241. The play process then ends. Thus, the processor serves as a play result data generator that generates play result data indicating win or lose of the two participant players based on the value of weighting factor stored, in the weighting factor data storage device, in association with identification data of an input instruction received by the second input instruction receiver.

Thus, processor 29, in a case in which an attack was performed at an effective fighting distance and timing, if the remaining power of the attacked character is above the value of the weighting factor, reduces the remaining power by the weight corresponding to the weighting factor, and if not above, changes the remaining power to 0, to determine the win of the attacking player (the loss by the attacked player) as a play result. This will be the same for an attack process (not shown) of character CB against character CA.

As shown in FIG. 7, when a play process ends, processor 29 causes screens 231 and 241 to display the play result (S5). Processor 29 then generates, based on play result data PR and input instruction counter TA, TB, count result data indicating the number of inputs for each input instruction, to transmit this count result data to communication apparatus 30 (S6).

The count result data includes win count data indicating the number of times input by a winner (Player A in FIG. 12) for each input instruction input by the winner, and loss count data indicating the number of times input by a loser (Player B in FIG. 12) for each input instruction that was input by the loser. Thus, processor 29 serves as a second counter that counts the number of inputs of an input instruction received by the second input instruction receiver for each input instruction and for each participant player, and generates, as count result data, based on the count result and the play result data, data indicating, for each input instruction, the number of times an input instruction was input by a participant player who won, and also indicating, for each input instruction, the number of times an input instruction was input by a participant player who lost, and processor 29 serves as a result data transmitter that transmits the count result data to the communication apparatus. Processor 29 then performs a postprocessing of the play process (S7). Specifically, the processor deallocates input instruction counter TA, TB and operation buffer BA,BB, to delete play result data PR from volatile area R1. Hereinafter, the process returns to Step S2.

4. Configuration of Communication Apparatus

Figure 13:
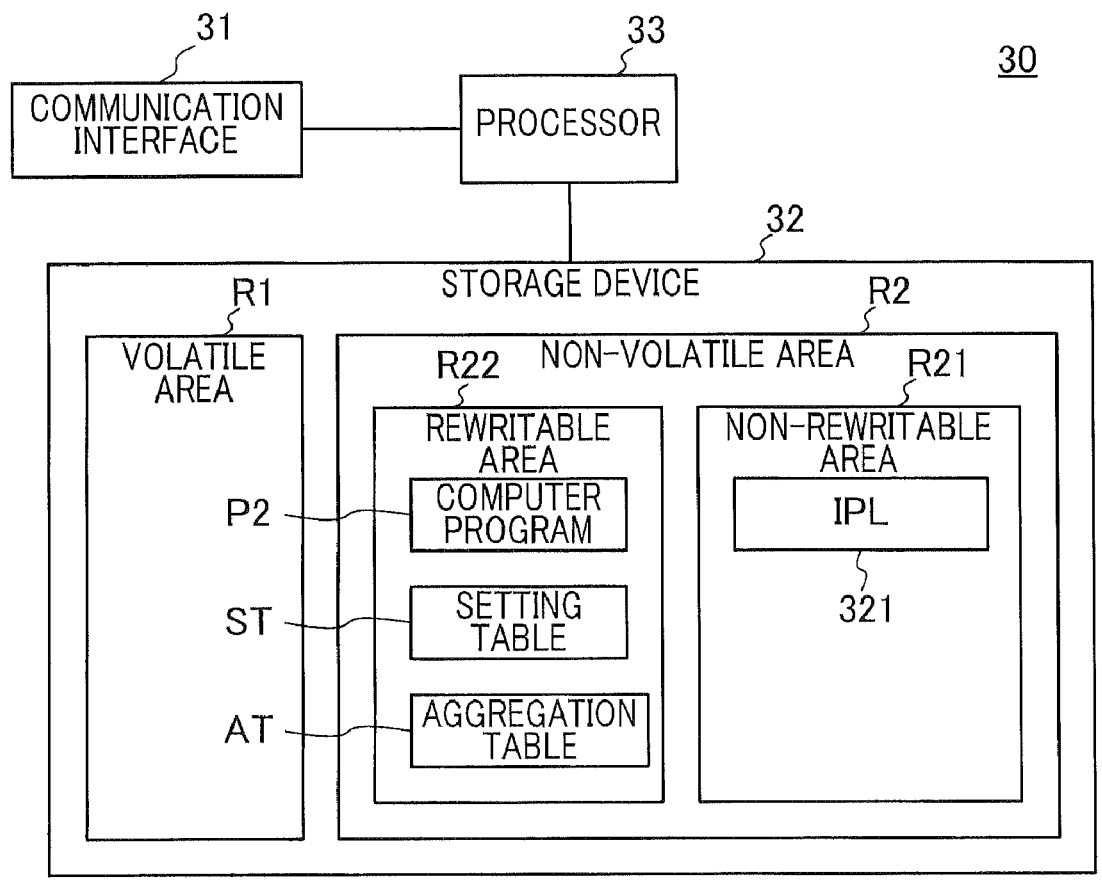
FIG. 13 is a block diagram showing an electrical configuration of a communication apparatus included in the game system.

FIG. 13 shows a block diagram showing an electrical configuration of communication apparatus 30. As shown in the figure, communication apparatus 30 has a communication interface (communicator) 31, a storage device 32, and a processor 33. Communication interface 31 is capable of transmitting to, and receives from, VPN apparatus 4, and transmits data to each game terminal 20 and receives data from each game terminal 20 in cooperation with processor 33 and via VPN 5. Thus, communication interface 31 and processor 33 serve as an outputter that outputs data to the outside and an input receiver that receives data from the outside.

Storage device 32 has a memory area and retains (stores) data written in this memory area. The memory area of storage device 32, like the memory area of storage device 28, is divided into a volatile area R1 and a non-volatile area R2. Non-volatile area R2 of storage device 32 is divided into a non-rewritable area R21 and a rewritable area R22. The configuration of storage device 32 can be freely selected, but in the present embodiment, like storage device 28, the memory area of RAM is used as volatile area R1, the memory area of ROM as non-rewritable area R21, and the memory area of a hard disk as rewritable area R22.

Volatile area R1 of storage device 32 is used for temporarily storing various types of data. Retained in rewritable area R22 of storage device 32 is a computer program P2 executed by processor 33. Retained in non-rewritable area R21 of storage device 32 is an IPL (Initial Program Loader) 321 for causing processor 33 to execute computer program P2. Processor 33, when power (not shown) is turned on, reads IPL 321 for execution, and reads computer program P2 for execution. By executing them, processor 33 performs an aggregation process, an update process, and a response process. The power (not shown) of communication apparatus 30 is basically never turned off once it is turned on.

Figures 14, 15, 16:
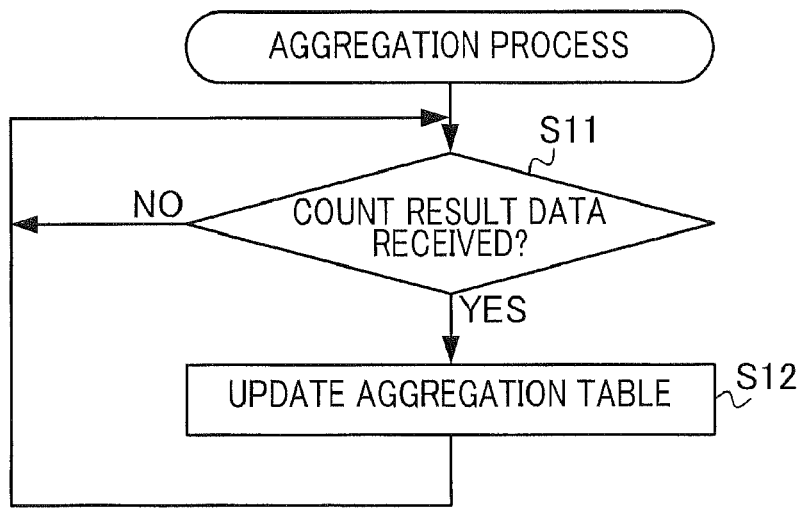
FIG. 14 is a diagram showing a configuration of a setting table in the communication apparatus.
FIG. 15 is a diagram showing a configuration of an aggregation table in the communication apparatus.
FIG. 16 is a flowchart showing a procedure of an aggregation process in the communication apparatus.

There is reserved, in rewritable area R22 of storage device 32, a setting table ST for setting weighting factors. The configuration of setting table ST is as shown in FIG. 14, and has as many records as the predetermined plural input instructions. Each record corresponds to each input instruction. Each record includes identification data of a corresponding input instruction and weighting factor data indicating the weighting factor (a design value) of the input instruction, and offset data indicating an offset to the weighting factor. The initial value of offset, i.e., the offset at the commencement of the operation of game system 10 (at the time of turning on the power (not shown) of communication apparatus 30), is 0.

In rewritable area R22 of storage device 32, there is reserved an aggregation table AT for aggregating a result of the play and count. The configuration of aggregation table AT is as shown in FIG. 15, and has as many records as the predetermined plural input instructions. Each record corresponds to each input instruction. Each record has stored identification data of corresponding input instruction and two types of aggregated value data indicating aggregated values of the number of inputs for this input instruction. One type of aggregated value data is aggregated win value data indicating a win count value, and the other type of aggregated value data is aggregated loss value data indicating an aggregated loss value. The win count value is an aggregated value of the number of times inputted by winners, and an aggregated loss value is an aggregated value of the number of times inputted by losers. The initial values of these aggregated values are 0.

5. Operation of Communication Apparatus

FIG. 16 is a flowchart showing a procedure of the aggregation process. In the aggregation process, processor 33 first determines whether it has received count result data (S11). As is obvious from this, processor 33 serves as a result data receiver that receives count result data. In a case in which a result of the determination is NO, the process returns to Step S11. In a case in which a result of the determination in Step S11 changes to YES by receiving count result data, processor 33 updates aggregation table AT based on the count result data (S12).

Specifically, processor 33 updates aggregated win value data of aggregation table AT based on win count data in the count result data, and updates aggregated loss value data of aggregation table AT based on loss count data in count result data. For example, in a case in which win count data in count result data indicates that the number of inputs of the first input instruction is 3, processor 33 updates win count data corresponding to identification data of the first input instruction so as to indicate a value that is greater by 3 than the aggregated value indicated by the win count data. Also, for example, in a case in which loss count data in the count result data shows that the number of inputs of the second input instruction is 4, processor 33 updates loss count data corresponding to the identification data of the second input instruction so as to indicate a value that is greater by 4 than the aggregated value indicated by the loss count data. That is, processor 33 serves as an aggregator that aggregates count result indicated by the count result data and generates aggregated result data indicating the result.

Hereinafter, the process returns to Step S11. That is, in the aggregation process, processor 33 waits until it receives count result data, and upon receiving count result data, updates aggregation table AT based on the received count result data. Therefore, aggregation table AT is updated every time a play is finished at any game terminal 20. As a result, the number of times an input instruction was input since the start of the operation of game system 10 is aggregated therein for each input instruction and for each play result.

FIG. 17 is a flowchart showing a procedure of an update process. The update process is executed only once in a predetermined period (once a day in the present embodiment). In the update process, processor 33 determines whether there is an input instruction for which a weighting factor is to be reset (S13). The input instruction for which a weighting factor is to be reset is an input instruction for which a weighting factor inadequate for the difficulty of an input operation thereof has been set, and in the present embodiment, is an input instruction for which the difference between a corresponding aggregated win value and a corresponding lose count value is greater than the predetermined standard value (positive value). This standard value may be a computing equation having as an argument the total number of inputs for the input instruction in game system 10, but is a constant number in the present embodiment. In Step S13, processor 33 refers to aggregation table AT, to determine whether there is any input instruction for which the difference between corresponding aggregated win value and corresponding aggregated loss value is greater than the above standard value. In a case in which a result of the determination is NO, the update process ends.

In a case in which a result of the determination in Step S13 is YES, processor 33 updates setting table ST based on aggregation table AT (S14). A detailed description will be given of this update, with reference to FIGS. 18 to 21. In this description, we assume that the above standard value is 5, that the contents of setting table ST are as shown in FIG. 18, and that the contents of aggregation table AT are as shown in FIG. 19. Processor 33 refers to aggregation table AT, to deduct corresponding aggregated loss value from corresponding aggregated win value as shown, for each input instruction, as shown in FIG. 20. Subsequently, processor 33 identifies an input instruction for which the absolute value of the deducted result (the difference) is above the standard value. For example, in FIG. 20, the second input instruction and the fourth input instruction are identified. Furthermore, although not shown in an example in FIG. 20, for example, an input instruction for which the deducted result has a negative value, i.e., the aggregated loss value is greater than the aggregated win value, and the absolute value of the deducted result is above the above standard value, is identified. Therefore, the above standard value is treated as prescribing an upper limit standard value (+1*standard value) and a lower limit standard value (−1*standard value). An input instruction for which the deducted result is above the upper limit standard value is an easy-to-win input instruction, and an input instruction for which the deducted result is below the lower limit standard value is a hard-to-win input instruction. Therefore, processor 33 serves as an easy-to-win input instruction identifier, based on aggregated result data, that identifies an input instruction for which the above deducted result is above the predetermined upper limit standard value, as an easy-to-win input instruction, and also serves as a hard-to-win input instruction identifier that identifies, based on aggregated result data, an input instruction for which the deducted result is below the predetermined lower limit standard value, as a hard-to-win input instruction. Processor 33 then determines an offset based on the deducted result and the standard value for each of the identified input instructions. Specifically, processor 33 determines, as an offset, a value obtained by dividing the deducted result by the standard value (positive value) and making inverse the sign (plus and minus) of the quotient. Processor 33 then updates offset data of setting table ST so that the offset data indicates the determined offset. As a result, the contents of setting table ST will be as shown in FIG. 21.

The update process ends when the process of Step S14 is completed. In short, in the update process, processor 33 obtains an offset, based on the aggregation table AT, for an input instruction for which the difference between the aggregated win value and the aggregated loss value is above the standard value, the offset corresponding to the difference obtained by deducting the aggregated loss value from the aggregated win value and on the standard value, to update offset data of setting table ST so that the offset data indicates the obtained offset.

Figure 22:
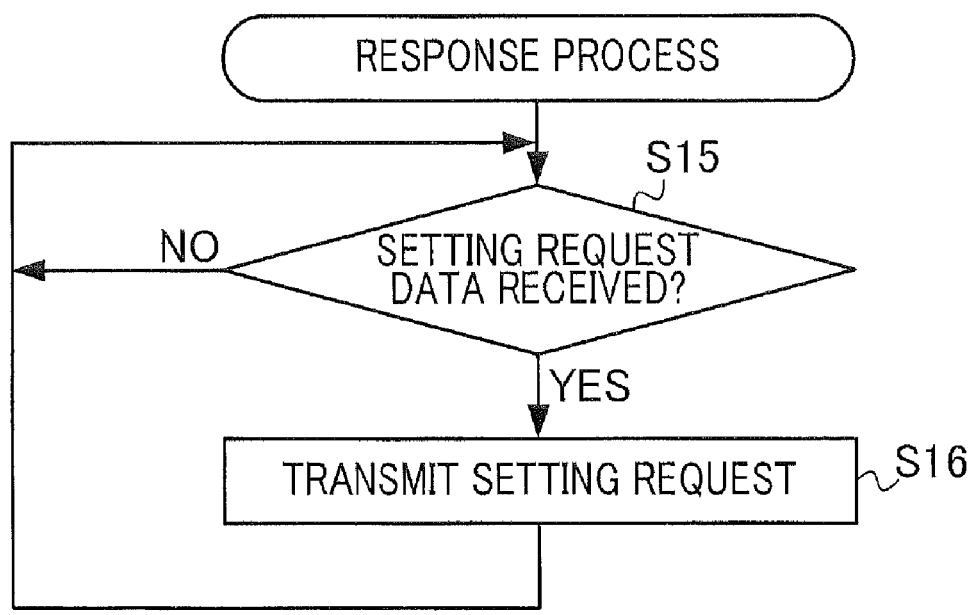
FIG. 22 is a flowchart showing a procedure of a response process in the communication apparatus.

FIG. 22 is a flowchart showing a procedure of a response process. In the response process, processor 33 first determines whether it has received setting request data (S15). In a case in which a result of the determination is NO, the process returns to Step S15. In a case in which a result of the determination in Step S15 changes to YES by receiving setting request data, processor 33 transmits setting data to the transmitter of this setting request data (S16).

Specifically, processor 33 refers to setting table ST, to obtain, for each input instruction, the sum of the offset and the weighting factor thereof and to generate data including data indicating the sum and the identification data of the input instruction. The generated data is transmitted as setting data to game terminal 20 that has transmitted the received setting request data. In other words, processor 33 serves as a second setting data transmitter that transmits, to a game terminal, setting data indicating a weighting factor in association with an input instruction identified by the easy-to-win input instruction identifier, the weighting factor less affecting a play result of a computer game than a weighting factor that has been set to the input instruction, and as a second setting data transmitter that transmits, to a game terminal, setting data indicating a weighting factor in association with an input instruction identified by the hard-to-win input instruction identifier, the weighting factor more greatly affecting a play result of a computer game than a weighting factor that has been set to the input instruction, the setting data being transmitted as setting data for the game terminal to reset weight factor data.

For example, in an example shown in FIG. 21, for the first input instruction, data that includes the identification data thereof and data indicating 5 will be transmitted as setting data and, for the fourth input instruction, data including identification data thereof and numerical data indicating 6 will be transmitted as setting data. However, in the present embodiment, since the upper limit value (for example, 10) and the lower limit value (for example, 1) for the weighting factor are determined in advance, in a case in which the above sum is above the upper limit value, numerical data indicating the upper limit value, instead of the numerical data indicating the sum, will be used; and in a case in which the above sum is below the lower limit value, numerical data indicating the lower limit value, instead of the numerical data indicating the sum, will be used.

Hereinafter, the process returns to Step S15. Thus, in the response process, processor 33 waits until it receives setting request data, and once it receives setting request data, generates setting data based on setting table ST, to transmit the generated setting data to game terminal 20 that has transmitted the setting request data.

6. Operation of Game Terminal (Resetting Process)

Figure 23:
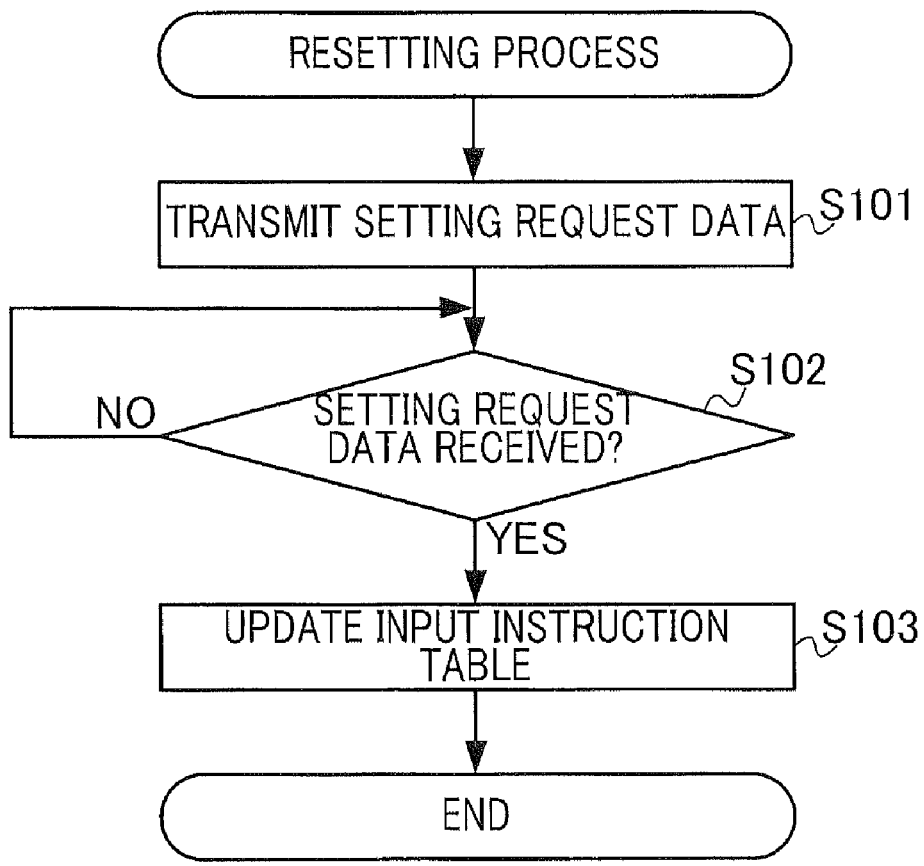
FIG. 23 is a flowchart showing a procedure of a resetting process in the game terminal.

FIG. 23 is a flowchart showing a procedure of a resetting process (Step S1 of FIG. 7). In the resetting process, processor 29 first transmits, to communication apparatus 30, setting request data requesting setting data for resetting the weighting factor (S101). Processor 29 then determines whether it has received the setting data (S102). As is obvious from this, processor 29 serves as a setting data receiver that receives setting data.

In a case in which a result of the determination in Step S102 is NO, the process returns to Step S102. In a case in which a result of the determination in Step S102 is YES, processor 29, based on the received setting data, updates input instruction table CT (S103). Specifically, processor 29 updates (resets) weighting factor data corresponding to identification data included in the setting data so that the weighting factor indicates a value indicated by the numerical data included in the setting data. The resetting process is thus completed. In other words, processor 29 serves as a setting data updater that updates weighting factor data indicating a weighting factor that has been set to an input instruction corresponding to setting data so that the updated weighting factor data indicates a weighting factor indicated by the setting data.

As described above, in the resetting process, a weighting factor is reset to a value that is more adequate for the difficulty of an input operation for an input instruction for which a weighting factor has been set that is inadequate for the difficulty of an input operation, based on setting table ST, i.e., based on the value of the number of times an input instruction has been input in game system 10 since the start of operation thereof, the value of the number of the inputs being aggregated for each input instruction and for each play result. Accordingly, the disruption of game balance in a play performed after updating the input instruction table CT is inhibited.

7. Modification

The present invention encompasses within its scope the following modifications obtained by modifying the above embodiment.

In the above embodiment, the first game was intended, but this may be modified so that a character operation game other than the first game is intended (Modification 1). The point is that a freely-selected computer game can be intended, if, in the computer game, a participant player is able to enter plural input instructions for each of which a weighting factor has been set and if a play result is determined based the value of the weighting factor that has been set to an input instruction input by the player.

Each of the above embodiment and Modification 1 can be modified in such a way that processor 29 of game terminal 20 serves as a first input instruction receiver instead of a second input instruction receiver, as a play result determiner instead of the play result data generator, and as a first counter instead of the second counter, and processor 33 of communication apparatus 30 serves as a high-usage input instruction identifier instead of the easy-to-win input instruction identifier, and as a first setting data transmitter instead of the second setting data transmitter (Modification 2).

Processor 29 that serves as the first input instruction receiver receives plural input instructions via an input interface such as various types of operation buttons, etc., during a play of the intended computer game, the instructions being received from a participant player who participates in the play of the computer game. Processor 29 that serves as the play result determiner determines a play result based on the value of a weighting factor stored in the weighting factor data storage device in association with identification data of an input instruction which the processor received as the first input instruction receiver. Processor 29 that serves as the first counter counts, for each input instruction, the number of inputs of the input instruction, which the processor received as the first input instruction receiver, to generate count result data indicating a result.

Processor 33 that serves as the high-usage input instruction identifier identifies, as a highly-used input instruction, an input instruction for which the number of inputs is above a predetermined upper limit standard value, the identification being performed based on the aggregated result data. This upper limit standard value is preferably a computing equation having, as an argument, the total number of inputs of input instructions in game system 10. In other words, since the aggregator accumulates the number of inputs for an input instruction every time it aggregates count result data transmitted from game terminal 20, the upper limit standard value is preferably a value depending on the total number of inputs of input instructions. Processor 33 that serves as the first setting data transmitter transmits to game terminal 20 setting data indicating a weighting factor in association with an input instruction which the processor identified as the high-usage input instruction identifier, the weighting factor less affecting a play result of the intended computer game than a weighting factor that has been set to the input instruction.

According to a modification for Modification 2, a computer game in which plural players can participate in one play is intended, in which play, processor 29 of game terminal 20 that serves as the first input instruction receiver receives plural input instructions from each of the plural participant players (Modification 3), or a computer game in which only a single player can participate in one play is intended, in which play, processor 29 of game terminal 20 that serves as the first input instruction receiver receives plural input instructions from the single participant player.

Modification 3 may be modified in such a way that the input interface is provided with plural operation units that outputs an operation signal according to the contents of an operation, that each of the plural operation units is operated respectively by plural participant players, that, in game terminal 20, processor 29 serves as plural first input instruction receivers corresponding to the plural operation units, and that processor 29 that serves as each of the first input instruction receivers receives an input instruction by identifying the input instruction based on an operation signal output from a corresponding operation unit.

According to another modification for Modification 2, setting data transmitted to game terminal 20 may be data indicating a weighting factor that less affects a play result of the intended computer game than a weighting factor that has been set to the corresponding input instruction by weight corresponding to the difference between the number of inputs of the corresponding input instruction and the upper limit standard value, or may be other data.

According to still another modification for Modification 2, in communication apparatus 30, processor 33 may serve, not as the hard-to-win input instruction identifier, but as a low-usage input instruction identifier that, based on aggregated result data, identifies, as a low-usage input instruction, an input instruction for which the number of inputs is below the predetermined lower limit standard value, and as the first setting data transmitter that transmits, to game terminal 20, setting data indicating a weighting factor in association with an input instruction identified by the low-usage input instruction identifier, the weighting factor more greatly affecting a play result of the intended computer game than a weighting factor that has been set to the input instruction, or may serve as other units. The lower limit standard value in the former case is preferably a computing equation having as an argument the total number of inputs of input instructions in game system 10.

In the above embodiment, processor 33 of communication apparatus 30 transmits setting data in response to setting request data. However, this may be modified to a mode in which setting data is transmitted to each game terminal 20 without receiving setting request data. In either case, setting data to be transmitted from communication apparatus 30 to each game terminal 20 is transmitted to each game terminal 20 as a resetting request for requesting the resetting of weighting factor data. In other words, processor 33 of communication apparatus 30 transmits setting data to each game terminal 20, thereby serving as a resetting requester for requesting the resetting of weighting factor data.

In the above embodiment, a game terminal is provided with plural operation units as an input interface, each of the plural operation units being respectively operated by plural players (participant players) to output an operation signal corresponding to the contents of operation, and also with plural first or second input instruction receivers corresponding to these operation units, but the present invention is not limited thereto. For example, in a case in which the present invention is applied to a system in which plural game terminals, each having a single operation unit and a single display unit, communicate with one another to implement a character operation game, each game terminal only has to have a single first or second input instruction receiver. Furthermore, the adjustment of game balance may be performed only by a single game terminal, or processor 33 of the communication apparatus may serve as the first or second input instruction receiver. In the latter case, the communication apparatus will be a game apparatus.

In the above embodiment, buttons and pedals are given as examples of the input interface of game terminal 20, but this is not limited thereto. For example, a handheld controller having an acceleration sensor or an infra-red position sensor may be used as the above input interface. Acceleration sensors and infra-red position sensors are capable of measuring changes in direction or in acceleration of the operation of the handheld controller, or changes in the position of the handheld controller. Therefore, in a case in which the handheld controller is used as an input interface, the processor may identify which one of the plural input instructions that can be input by a player corresponds to an input operation by the handheld controller, based on the measured changes in direction or in acceleration or on the measured moving distance. Also, in this case, a weighting factor is set to each of the plural input instructions, and a play result is determined based on the value of the weighting factor of the identified input instruction.

In the above embodiment and modifications, processor 33 serves as the high-usage input instruction identifier and the low-usage input instruction identifier, or the easy-to-win input instruction identifier and the hard-to-win input instruction identifier, but this may be modified so that the processor serves as either one. Furthermore, in the above embodiment, a single standard value was used to decide the upper limit standard value and the lower limit standard value, but this may be modified so that the upper limit standard value and the lower limit standard value are determined separately.

The invention claimed is:

1. A game system comprising:
   a game terminal for use in a computer game; and
   a communication apparatus for communicating with the game terminal, the game terminal comprising:
   an input interface;
   an input instruction receiver that receives, via the input interface, plural input instructions from a participant player who participates in a play of the computer game during the play of the computer game, wherein each of the plural input instructions includes a sequence of input operations;

a weighting factor data storage device that stores, in association with identification data for uniquely identifying each of the plural input instructions, weighting factor data indicating a weighting factor that has been set to each of the plural input instructions;

a play result determiner that determines a result of the play based on the value of a weighting factor indicated by the weighting factor data that has been stored in the weighting factor data storage device in association with identification data of an input instruction received by the input instruction receiver;

a counter that counts the number of inputs for each input instruction received by the input instruction receiver and that generates count result data indicating results of the count; and a result data transmitter that transmits the count result data to the communication apparatus, the communication apparatus comprising:

a result data receiver that receives the count result data;

an aggregator that aggregates the count results indicated by the count result data to generate aggregated result data;

a high-usage input instruction identifier that, based on the aggregated result data, identifies, as a highly-used input instruction, an input instruction for which the number of inputs exceeds a predetermined upper limit standard value; and a setting data transmitter that transmits, to the game terminal, setting data which indicates a weighting factor that less affects a result of the play than a weighting factor that has been set to the input instruction identified by the high-usage input instruction identifier, after associating the setting data with the identified input instruction, and the game terminal further comprising:

a setting data receiver that receives the setting data; and a weighting factor data updater that updates weighting factor data indicating the weighting factor that has been set to the input instruction corresponding to the setting data so that the updated weighting factor data indicates the weighting factor indicated by the setting data.

2. A game system according to claim 1, wherein, in the computer game, plural players are able to participate in a single play of the game; and wherein the input instruction receiver receives, in the single play of the computer game, input instructions from each of the plural participant players of the play.

3. A game system according to claim 2, wherein the input interface is provided with plural operation units, with each operation unit for outputting an operation signal corresponding to an operation and being operated by each of the plural participant players;

wherein the game terminal is provided with a plurality of input instruction receivers respectively corresponding to the plural operation units; and wherein a respective input instruction receiver receives an input instruction after identifying the input instruction based on the operation signal output from a corresponding one of the operation units.

4. A game system according to claim 1, wherein the setting data transmitted to the game terminal indicates the weighting factor that less affects a result of the play of the computer game than the weighting factor that has been set to the corresponding input instruction by the weight corresponding to the difference between the number of inputs of the corresponding input instruction and a predetermined upper limit standard value.

5. A game system according to claim 1, wherein the communication apparatus comprises a low-usage input instruction identifier that identifies, based on the aggregated result data, an input instruction for which the number of inputs falls below a predetermined lower limit standard value; and wherein the setting data transmitter transmits, to the game terminal, setting data which indicates a weighting factor that more greatly affects a result of the play than the weighting factor that has been set to the input instruction identified by the low-usage input instruction identifier, after associating the setting data with the identified input instruction.

6. A game system comprising:

a game terminal for use in a computer game; and a communication apparatus for communicating with the game terminal, the game terminal comprising:

an input interface;

an input instruction receiver that receives, via the input interface, plural input instructions from two participant players who participate in a play of the computer game during the play;

a weighting factor data storage device that stores, in association with identification data for uniquely identifying each of the plural input instructions, weighting factor data indicating a weighting factor that has been set to each of the plural input instructions;

a play result data generator that generates play result data indicating win or lose for the two players, based on the value of a weighting factor indicated by the weighting factor data that has been stored in the weighting factor data storage device in association with identification data of an input instruction received by the input instruction receiver;

a counter that counts, for each input instruction and for each participant player, the number of inputs of an input instruction received by the input instruction receiver to generate, based on results of the count and on the play result data, data which indicates, for each input instruction, the number of inputs performed by the winner player and which also indicates, for each input instruction, the number of inputs performed by the defeated player, as count result data; and a result data transmitter that transmits the count result data to the communication apparatus, the communication apparatus comprising:

a result data receiver that receives the count result data;

an aggregator that aggregates the count results indicated by the count result data to generate aggregated result data;

an easy-to-win input instruction identifier that, based on the aggregated result data identifies an input instruction for which the difference in the number of inputs obtained by deducting the number of inputs by the defeated player from the number of inputs by the winner player exceeds an upper limit standard value as an easy-to-win input instruction; and a setting data transmitter that transmits, to the game terminal, setting data which indicates a weighting factor that less affects a result of the play than a weighting factor that has been set to the input instruction identified by the easy-to-win input instruction identifier, after associating the setting data with the identified input instruction, and the game terminal further comprising:
  a setting data receiver that receives the setting data; and
  a weighting factor data updater that updates weighting factor data indicating the weighting factor that has been set to the input instruction corresponding to the setting data so that the updated weighting factor data indicates the weighting factor indicated by the setting data.

7. A game system according to claim 6, further comprising:
a hard-to-win input instruction identifier that, based on the aggregated result data, identifies an input instruction for which the difference in the number of inputs obtained by deducting the number of inputs by the defeated player from the number of inputs by the winner player falls below a lower limit standard value as a hard-to-win input instruction,
wherein the setting data transmitter transmits, to the game terminal, setting data which indicates a weighting factor that more greatly affects a result of the play than a weighting factor that has been set to the input instruction identified by the hard-to-win input instruction identifier, after associating the setting data with the identified input instruction.

8. A communication apparatus for use in a game system of a computer game, the communication apparatus comprising:
a communicator for communicating with a game terminal that is provided with: an input interface; a input instruction receiver that receives, via the input interface, plural input instructions from a participant player who participates in a play of the computer game during the play, wherein each of the plural input instructions includes a sequence of input operations; a weighting factor data storage device that stores, in association with identification data for uniquely identifying each of the plural input instructions, weighting factor data indicating a weighting factor that has been set to each of the plural input instructions; a play result determiner that determines a result of the play based on the value of a weighting factor indicated by the weighting factor data that has been stored in the weighting factor data storage device in association with identification data of an input instruction received by the input instruction receiver; a counter that counts the number of inputs for each input instruction received by the input instruction receiver and that generates count result data indicating results of the count; a result data transmitter that transmits the count result data to the communication apparatus; a setting data receiver that receives setting data for resetting the weighting factor data; and a weighting factor data updater that updates weighting factor data indicating the weighting factor that has been set to the input instruction corresponding to the setting data so that the updated weighting factor data indicates the weighting factor indicated by the setting data;
a result data receiver that receives, via the communicator, the count result data;
an aggregator that aggregates the count results indicated by the count result data to generate aggregated result data;
a high-usage input instruction identifier that, based on the aggregated result data, identifies an input instruction for which the number of inputs exceeds a predetermined upper limit standard value; and
a setting data transmitter that transmits, via the communicator, to the game terminal, setting data which indicates the value of a weighting factor that less affects a result of the play than the weighting factor that has been set to the input instruction identified by the high-usage input instruction identifier, after associating the setting data with the identified input instruction, with the setting data for enabling the game terminal to reset the weighting factor data.

9. A non-transitory computer readable storage medium which stores a computer program to be executed in a communication apparatus for use in a game system of a computer game,
the communication apparatus having a communicator for communicating with a game terminal that is provided with: an input interface; a input instruction receiver that receives, via the input interface, plural input instructions from a participant player who participates in a play of the computer game during the play, wherein each of the plural input instructions includes a sequence of input operations; a weighting factor data storage device that stores, in association with identification data for uniquely identifying each of the plural input instructions, weighting factor data indicating a weighting factor that has been set to each of the plural input instructions; a play result determiner that determines a result of the play based on the value of a weighting factor indicated by the weighting factor data that has been stored in the weighting factor data storage device in association with identification data of an input instruction received by the input instruction receiver; a counter that counts the number of inputs for each input instruction received by the input instruction receiver and that generates count result data indicating results of the count; a result data transmitter that transmits the count result data to the communication apparatus; a setting data receiver that receives setting data for resetting the weighting factor data; and a setting data updater that updates weighting factor data indicating a weighting factor that has been set to the input instruction corresponding to the setting data so that the updated weighting factor data indicates the weighting factor indicated by the setting data,
the computer program causing the communication apparatus to execute:
a result data receiving process of receiving, via the communicator, the count result data;
an aggregating process of aggregating the count results indicated by the count result data to generate aggregated result data;
a high-usage input instruction identifying process of, based on the aggregated result data, identifying an input instruction for which the number of inputs exceeds a predetermined upper limit standard value; and
a setting data transmitting process of transmitting, via the communicator, to the game terminal, setting data which indicates a weighting factor that less affects a result of the play than a weighting factor that has been set to the input instruction identified in the high-usage input instruction identifying process, after associating the setting data with the identified input instruction, with the setting data for enabling the game terminal to reset the weighting factor data.

10. A game terminal for use in a game system of a computer game,
the game terminal comprising:
an input interface;
a input instruction receiver that receives, via the input interface, plural input instructions from a participant player who participates in a play of the computer game during the play, wherein each of the plural input instructions includes a sequence of input operations;

a weighting factor data storage device that stores, in association with identification data for uniquely identifying each of the plural input instructions, weighting factor data indicating a weighting factor that has been set to each of the plural input instructions;

a play result determiner that determines a result of the play based on the value of a weighting factor indicated by the weighting factor data that has been stored in the weighting factor data storage device in association with identification data of an input instruction received by the input instruction receiver;

a counter that counts the number of inputs for each input instruction received by the input instruction receiver and that generates count result data indicating results of the count;

a result data transmitter that transmits the count result data to a communication apparatus that is provided with:
  a result data receiver that receives the count result data;
  an aggregator that aggregates the count results indicated by the count result data to generate aggregated result data;
  a high-usage input instruction identifier that, based on the aggregated result data, identifies an input instruction for which the number of inputs exceeds a predetermined upper limit standard value; and
  a setting data transmitter that transmits, to the game terminal, setting data which indicates a weighting factor that less affects a result of the play than a weighting factor that has been set to the input instruction identified by the high-usage input instruction identifier, after associating the setting data with the identified input instruction;

a setting data receiver that receives the setting data from the communication apparatus; and a weighting factor data updater that updates weighting factor data indicating the weighting factor that has been set to the input instruction corresponding to the setting data so that the updated weighting factor data indicates the weighting factor indicated by the setting data.

11. A non-transitory computer readable storage medium which stores a computer program for causing a game terminal for use in a game system of a computer game to execute:

a input instruction receiving process of receiving, via an input interface of the game terminal, plural input instructions from a participant player who participates in a play of the computer game during the play, wherein each of the plural input instructions includes a sequence of input operations;

a play result determining process of determining a result of the play based on the value of a weighting factor indicated by the weighting factor data that has been stored in a weighting factor data storage device of the game terminal in association with identification data of an input instruction received in the input instruction receiving process, the weighting factor data storage device having stored, in association with identification data for uniquely identifying each of the plural input instructions, weighting factor data indicating a weighting factor that has been set to each of the plural input instructions;

a counting process that counts the number of inputs for each input instruction received in the input instruction receiving process and that generates count result data indicating results of the count;

a result data transmitting process of transmitting the count result data to a communication apparatus that is provided with:
  a result data receiver that receives the count result data;
  an aggregator that aggregates the count results indicated by the count result data to generate aggregated result data;
  a high-usage input instruction identifier that, based on the aggregated result data, identifies an input instruction for which the number of inputs exceeds a predetermined upper limit standard value; and
  a setting data transmitter that transmits, to the game terminal, setting data which indicates a weighting factor that less affects a result of the play than a weighting factor that has been set to the input instruction identified by the high-usage input instruction identifier, after associating the setting data with the identified input instruction;

a setting data receiving process of receiving the setting data from the communication apparatus; and a weighting factor data updating process of updating weighting factor data indicating the weighting factor that has been set to the input instruction corresponding to the setting data so that the updated weighting factor data indicates the weighting factor indicated by the setting data.

12. A game apparatus of a computer game, comprising:

an input interface;

a input instruction receiver that receives, via the input interface, plural input instructions from a participant player who participates in a play of the computer game during the play, wherein each of the plural input instructions includes a sequence of input operations;

a weighting factor data storage device that stores, in association with identification data for uniquely identifying each of the plural input instructions, weighting factor data indicating a weighting factor that has been set to each of the plural input instructions;

a play result determiner that determines a result of the play based on the value of a weighting factor indicated by the weighting factor data that has been stored in the weighting factor data storage device in association with identification data of an input instruction received by the input instruction receiver;

a counter that counts the number of inputs for each input instruction received by the input instruction receiver and that generates count result data indicating results of the count;

an aggregator that aggregates the count results indicated by the count result data to generate aggregated result data;

a high-usage input instruction identifier that, based on the aggregated result data, identifies an input instruction for which the number of inputs exceeds a predetermined upper limit standard value; and a resetter that updates weighting factor data indicating the weighting factor that has been set to the input instruction identified by the high-usage input instruction identifier, so that the updated weighting factor data indicates a weighting factor that less affects a result of the play than the weighting factor set to the identified input instruction.

13. A non-transitory computer readable storage medium which stores a computer program for causing a game apparatus of a computer game to execute:

a input instruction receiving process of receiving, via an input interface of the game apparatus, plural input instructions from a participant player who participates in a play of the computer game during the play, wherein each of the plural input instructions includes a sequence of input operations;

a play result determining process of determining a result of the play based on the value of a weighting factor indicated by the weighting factor data that has been stored in a weighting factor data storage device of the game apparatus in association with identification data of an input instruction received in the input instruction receiving process, the weighting factor data storage device having stored, in association with identification data for uniquely identifying each of the plural input instructions, weighting factor data indicating a weighting factor that has been set to each of the plural input instructions;

a counting process of counting the number of inputs for each input instruction received in the input instruction receiving process and that generates count result data indicating results of the count;

an aggregating process of aggregating the count results indicated by the count result data to generate aggregated result data;

a high-usage input instruction identifying process of, based on the aggregated result data, identifying an input instruction for which the number of inputs exceeds a predetermined upper limit standard value; and a resetting process of updating weighting factor data indicating the weighting factor that has been set to the input instruction identified in the high-usage input instruction identifying process, so that the updated weighting factor data indicates a weighting factor that less affects a result of the play than the weighting factor set to the identified input instruction.

14. A communication apparatus for use in a game system of a computer game, the communication apparatus comprising:

a communicator for communicating with a game terminal that is provided with:
an input interface;
an input instruction receiver that receives, via the input interface, plural input instructions from two participant players who participate in a play of the computer game during the play;
a weighting factor data storage device that stores, in association with identification data for uniquely identifying each of the plural input instructions, weighting factor data indicating a weighting factor that has been set to each of the plural input instructions;
a play result data generator that generates play result data indicating win or lose for the two players, based on the value of a weighting factor indicated by the weighting factor data that has been stored in the weighting factor data storage device in association with identification data of an input instruction received by the second input instruction receiver;
a counter that counts, for each input instruction and for each participant player, the number of inputs of an input instruction received by the input instruction receiver to generate, based on results of the count and on the play result data, data which indicates, for each input instruction, the number of inputs performed by the winner player and which also indicates, for each input instruction, the number of inputs performed by the defeated player, as count result data;
a result data transmitter that transmits the count result data to the communication apparatus;
a setting data receiver that receives setting data for resetting the weighting factor data; and
a weighting factor data updater that updates weighting factor data indicating the weighting factor that has been set to the input instruction corresponding to the setting data so that the updated weighting factor data indicates the weighting factor indicated by the setting data;

a result data receiver that receives, via the communicator, the count result data;

an aggregator that aggregates the count results indicated by the count result data to generate aggregated result data;

an easy-to-win input instruction identifier that, based on the aggregated result data, identifies an input instruction for which the difference in the number of inputs obtained by deducting the number of inputs by the defeated player from the number of inputs by the winner player exceeds an upper limit standard value as an easy-to-win input instruction; and a setting data transmitter that transmits, via the communicator, to the game terminal, setting data which indicates the value of a weighting factor that less affects a result of the play than the weighting factor that has been set to the input instruction identified by the easy-to-win input instruction identifier, after associating the setting data with the identified input instruction, with the setting data for enabling the game terminal to reset the weighting factor data.

15. A non-transitory computer readable storage medium which stores a computer program to be executed in a communication apparatus for use in a game system of a computer game, the communication apparatus having a communicator for communicating with a game terminal that is provided with:
an input interface;
an input instruction receiver that receives, via the input interface, plural input instructions from two participant players who participate in a play of the computer game during the play;
a weighting factor data storage device that stores, in association with identification data for uniquely identifying each of the plural input instructions, weighting factor data indicating a weighting factor that has been set to each of the plural input instructions;
a play result data generator that generates play result data indicating win or lose for the two players, based on the value of a weighting factor indicated by the weighting factor data that has been stored in the weighting factor data storage device in association with identification data of an input instruction received by the input instruction receiver;
a counter that counts, for each input instruction and for each participant player, the number of inputs of an input instruction received by the input instruction receiver to generate, based on results of the count and on the play result data, data which indicates, for each input instruction, the number of inputs performed by the winner player and which also indicates, for each input instruction, the number of inputs performed by the defeated player, as count result data;
a result data transmitter that transmits the count result data to the communication apparatus;
a setting data receiver that receives setting data for resetting the weighting factor data; and
a weighting factor data updater that updates weighting factor data indicating the weighting factor that has been set to the input instruction corresponding to the setting data so that the updated weighting factor data indicates the weighting factor indicated by the setting data, the computer program causing the communication apparatus to execute:

a result data receiving process of receiving, via the communicator, the count result data;

an aggregating process of aggregating the count results indicated by the count result data to generate aggregated result data;

an easy-to-win input instruction identifying process of, based on the aggregated result data, identifying an input instruction for which the difference in the number of inputs obtained by deducting the number of inputs by the defeated player from the number of inputs by the winner player exceeds an upper limit standard value as an easy-to-win input instruction; and a setting data transmitting process of transmitting, via the communicator, to the game terminal, setting data which indicates a weighting factor that less affects a result of the play than a weighting factor that has been set to the input instruction identified in the easy-to-win input instruction identifying process, after associating the setting data with the identified input instruction, with the setting data for enabling the game terminal to reset the weighting factor data.

16. A game terminal for use in a game system of a computer game, the game terminal comprising:

an input interface;

an input instruction receiver that receives, via the input interface, plural input instructions from two participant players who participate in a play of the computer game during the play;

a weighting factor data storage device that stores, in association with identification data for uniquely identifying each of the plural input instructions, weighting factor data indicating a weighting factor that has been set to each of the plural input instructions;

a play result data generator that generates play result data indicating win or lose for the two players, based on the value of a weighting factor indicated by the weighting factor data that has been stored in the weighting factor data storage device in association with identification data of an input instruction received by the input instruction receiver;

a counter that counts, for each input instruction and for each participant player, the number of inputs of an input instruction received by the input instruction receiver to generate, based on results of the count and on the play result data, data which indicates, for each input instruction, the number of inputs performed by the winner player and which also indicates, for each input instruction, the number of inputs performed by the defeated player, as count result data;

a result data transmitter that transmits the count result data to a communication apparatus that is provided with:

a result data receiver that receives the count result data;

an aggregator that aggregates the count results indicated by the count result data to generate aggregated result data;

an easy-to-win input instruction identifier that, based on the aggregated result data, identifies an input instruction for which the difference in the number of inputs obtained by deducting the number of inputs by the defeated player from the number of inputs by the winner player exceeds an upper limit standard value as an easy-to-win input instruction; and a setting data transmitter that transmits, to the game terminal, setting data which indicates a weighting factor that less affects a result of the play than a weighting factor that has been set to the input instruction identified by the easy-to-win input instruction identifier, after associating the setting data with the identified input instruction;

a setting data receiver that receives the setting data from the communication apparatus; and a weighting factor data updater that updates weighting factor data indicating the weighting factor that has been set to the input instruction corresponding to the setting data so that the updated weighting factor data indicates the weighting factor indicated by the setting data.

17. A non-transitory computer readable storage medium which stores a computer program for causing a game terminal for use in a game system of a computer game to execute:

an input instruction receiving process of receiving, via an input interface of the game terminal, plural input instructions from two participant players who participate in a play of the computer game during the play;

a play result data generating process of generating play result data indicating win or lose for the two players, based on the value of a weighting factor indicated by the weighting factor data that has been stored in a weighting factor data storage device of the game terminal in association with identification data of an input instruction received in the input instruction receiving process, the weighting factor data storage device having stored, in association with identification data for uniquely identifying each of the plural input instructions, weighting factor data indicating a weighting factor that has been set to each of the plural input instructions;

a counting process of counting, for each input instruction and for each participant player, the number of inputs of an input instruction received in the input instruction receiving process to generate, based on results of the count and on the play result data, data which indicates, for each input instruction, the number of inputs performed by the winner player and which also indicates, for each input instruction, the number of inputs performed by the defeated player, as count result data;

a result data transmitting process of transmitting the count result data to a communication apparatus that is provided with:

a result data receiver that receives the count result data;

an aggregator that aggregates the count results indicated by the count result data to generate aggregated result data;

an easy-to-win input instruction identifier that, based on the aggregated result data, identifies an input instruction for which the difference in the number of inputs obtained by deducting the number of inputs by the defeated player from the number of inputs by the winner player exceeds an upper limit standard value as an easy-to-win input instruction; and a setting data transmitter that transmits, to the game terminal, setting data which indicates a weighting factor that less affects a result of the play than a weighting factor that has been set to the input instruction identified in the easy-to-win input instruction identifying process, after associating the setting data with the identified input instruction;

a setting data receiving process of receiving the setting data from the communication apparatus; and a weighting factor data updating process of updating weighting factor data indicating the weighting factor that has been set to the input instruction corresponding to the setting data so that the updated weighting factor data indicates the weighting factor indicated by the setting data.

18. A game apparatus of a computer game, comprising:

an input interface;

an input instruction receiver that receives, via the input interface, plural input instructions from two participant players who participate in a play of the computer game during the play;

a weighting factor data storage device that stores, in association with identification data for uniquely identifying each of the plural input instructions, weighting factor data indicating a weighting factor that has been set to each of the plural input instructions;

a play result data generator that generates play result data indicating win or lose for the two players, based on the value of a weighting factor indicated by the weighting factor data that has been stored in the weighting factor data storage device in association with identification data of an input instruction received by the second input instruction receiver;

a counter that counts, for each input instruction and for each participant player, the number of inputs of an input instruction received by the input instruction receiver to generate, based on results of the count and on the play result data, data which indicates, for each input instruction, the number of inputs performed by the winner player and which also indicates, for each input instruction, the number of inputs performed by the defeated player, as count result data;

an aggregator that aggregates the count results indicated by the count result data to generate aggregated result data;

an easy-to-win input instruction identifier that, based on the aggregated result data, identifies an input instruction for which the difference in the number of inputs obtained by deducting the number of inputs by the defeated player from the number of inputs by the winner player exceeds an upper limit standard value as an easy-to-win input instruction; and a resetter that updates weighting factor data indicating the weighting factor that has been set to the input instruction identified by the easy-to-win input instruction identifier, so that the updated weighting factor data indicates a weighting factor that less affects a result of the play than the weighting factor set to the identified input instruction.

19. A non-transitory computer readable storage medium which stores a computer program for causing a game apparatus of a computer game to execute:

an input instruction receiving process of receiving, via an input interface of the game apparatus, plural input instructions from two participant players who participate in a play of the computer game during the play;

a play result data generating process of generating play result data indicating win or lose for the two players, based on the value of a weighting factor indicated by the weighting factor data that has been stored in a weighting factor data storage device in association with identification data of an input instruction received in the input instruction receiving process, the weighting factor data storage device having stored, in association with identification data for uniquely identifying each of the plural input instructions, weighting factor data indicating a weighting factor that has been set to each of the plural input instructions;

a counting process of counting, for each input instruction and for each participant player, the number of inputs of an input instruction received in the input instruction receiving process to generate, based on results of the count and on the play result data, data which indicates, for each input instruction, the number of inputs performed by the winner player and which also indicates, for each input instruction, the number of inputs performed by the defeated player, as count result data;

an aggregating process of aggregating the count results indicated by the count result data to generate aggregated result data;

an easy-to-win input instruction identifying process of, based on the aggregated result data, identifying an input instruction for which the difference in the number of inputs obtained by deducting the number of inputs by the defeated player from the number of inputs by the winner player exceeds an upper limit standard value as an easy-to-win input instruction; and a resetting process of updating weighting factor data indicating the weighting factor that has been set to the input instruction identified in the easy-to-win instruction identifying process, so that the updated weighting factor data indicates a weighting factor that less affects a result of the play than the weighting factor set to the identified input instruction.

* * * * *